United States Patent
Dehkordi et al.

(10) Patent No.: US 11,774,762 B1
(45) Date of Patent: Oct. 3, 2023

(54) METHODS AND SYSTEMS FOR PROGRAMMING MOMENTUM AND INCREASING LIGHT EFFICIENCY ABOVE 25% IN FOLDED OPTICS AND FIELD EVOLVING CAVITIES

(71) Applicant: Brelyon, Inc., Redwood City, CA (US)

(72) Inventors: Barmak Heshmat Dehkordi, San Mateo, CA (US); Christopher Barsi, Lee, NH (US); Albert Redo Sanchez, San Mateo, CA (US)

(73) Assignee: Brelyon, Inc., Redwood City, CA (US)

( * ) Notice: Subject to any disclaimer, the term of this patent is extended or adjusted under 35 U.S.C. 154(b) by 0 days.

(21) Appl. No.: 17/947,005

(22) Filed: Sep. 16, 2022

(51) Int. Cl.
*G02B 27/01* (2006.01)
*G02B 27/28* (2006.01)
*G02B 26/08* (2006.01)

(52) U.S. Cl.
CPC ..... *G02B 27/0172* (2013.01); *G02B 26/0808* (2013.01); *G02B 27/285* (2013.01)

(58) Field of Classification Search
CPC ........... G02F 1/01791; G02B 27/0172; G02B 27/285; G02B 26/0808; G02B 27/0101; G02B 2027/0178; G02B 27/144; G02B 27/283; G02B 27/30; G02B 30/10; G02B 30/40; G02B 2027/0116; G02B 2027/013; G02B 2027/0132; G02B 27/0093; G02B 27/145; G02B 27/286; G02B 30/25; G02B 30/26; G02B 30/52; G02B 5/10; G02B 5/288; G02B 6/005; G02B 13/0095; G02B 13/22; G02B 2027/0112; G02B 2027/0123; G02B 2027/0134; G02B 2027/0136; G02B 2027/0141; G02B 2027/0187; G02B 25/001; G02B 27/0075; G02B 27/0081; G02B 27/017; G02B 27/0179; G02B 27/10; G02B 27/1066; G02B 27/143; G02B 3/14; G02B 30/35; G02B 30/60; G02B 5/30; G02B 5/3083; G02B 6/0026; G02B 6/003; G02B 6/0036; G02B 6/0038
USPC ........................................................ 359/630
See application file for complete search history.

(56) References Cited

U.S. PATENT DOCUMENTS

| | | | |
|---|---|---|---|
| 2018/0292713 A1* | 10/2018 | Drolet | G02F 1/133621 |
| 2020/0150453 A1* | 5/2020 | Dehkordi | G02B 30/40 |
| 2021/0356760 A1* | 11/2021 | Dehkordi | G02B 30/10 |
| 2022/0397763 A1* | 12/2022 | Amirsolaimani | G02B 27/144 |

* cited by examiner

*Primary Examiner* — Collin X Beatty
(74) *Attorney, Agent, or Firm* — Sheppard Mullin Richter & Hampton LLP

(57) ABSTRACT

Some implementations of the disclosure relate to an optical system, including: a first light source; a secondary light source that is optically coupled to the first light source; a reflective element that is transparent with respect to the first light source but reflective with respect to the secondary light source, the reflective element being disposed between the first light source and the secondary light source; and a semi-reflective layer disposed on the secondary light source, such that reflection of light from the secondary light source by the reflective element and back through the semi-reflective element results in greater than 25% of the light from first light source exiting the optical system.

25 Claims, 17 Drawing Sheets

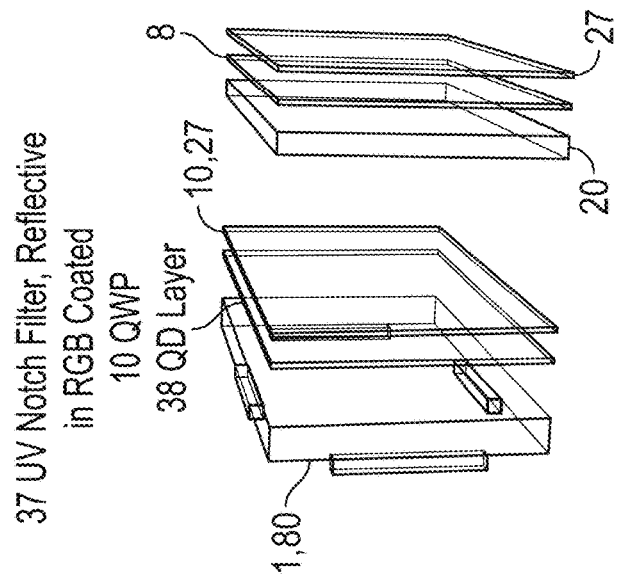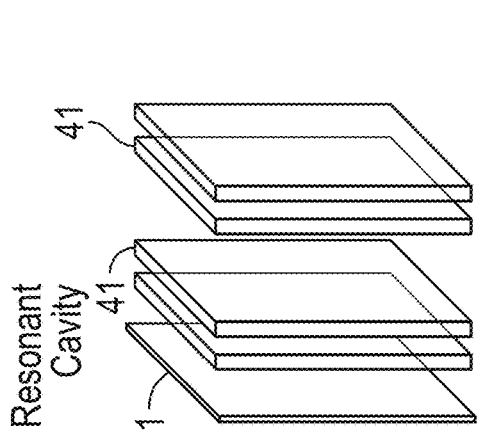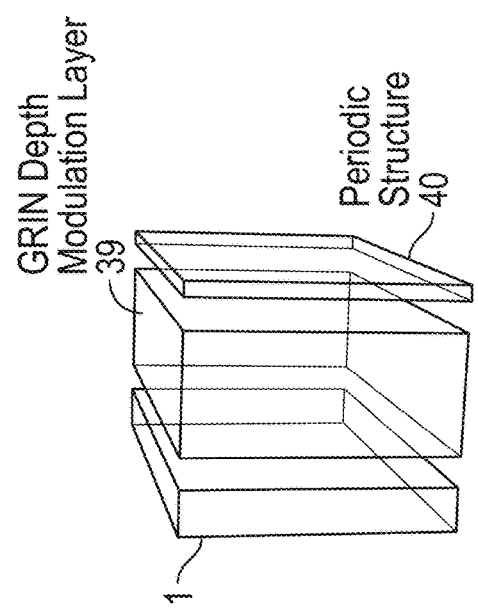

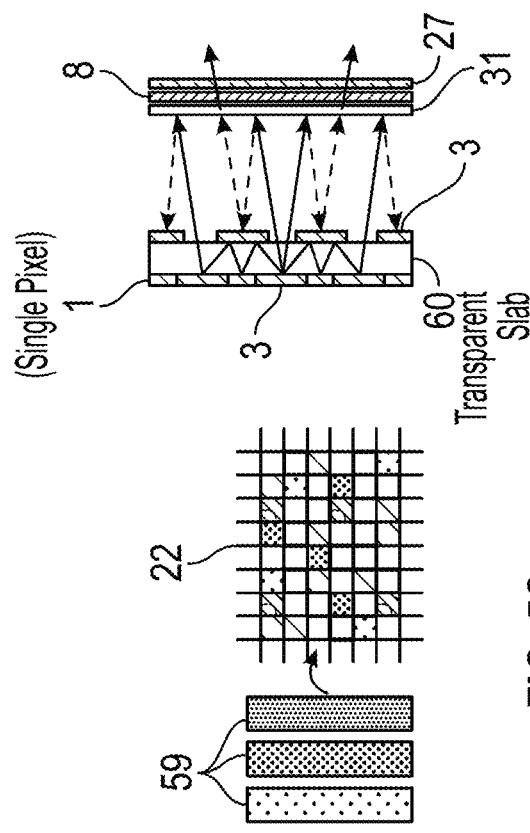
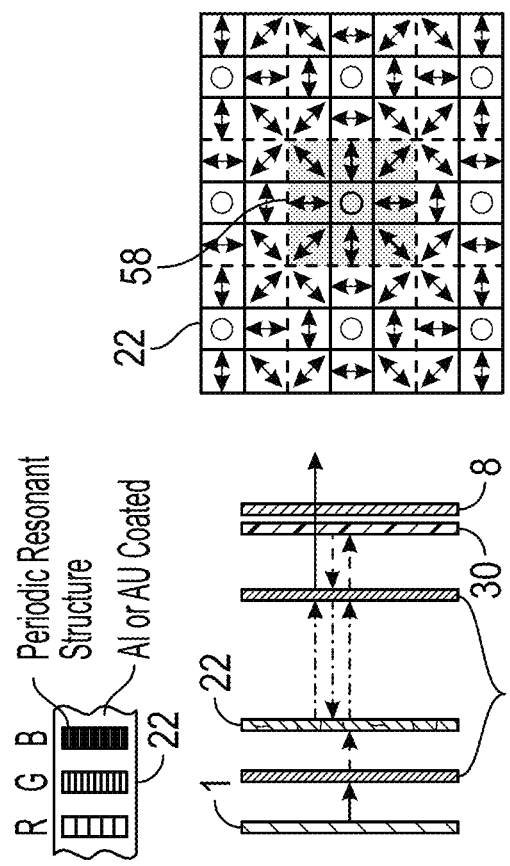
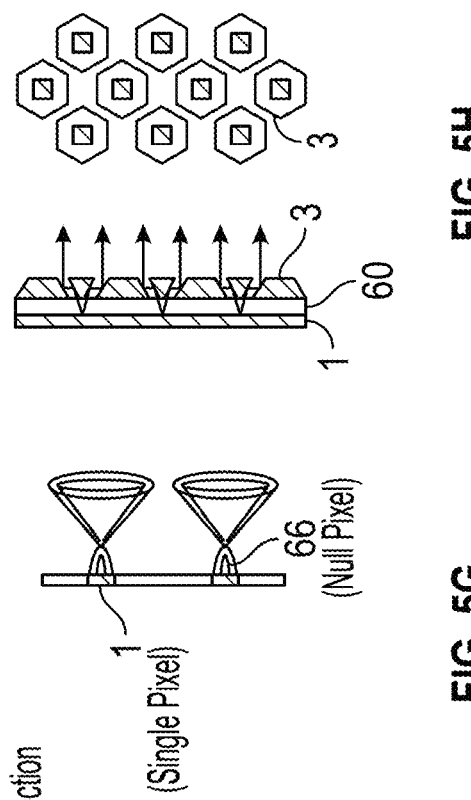
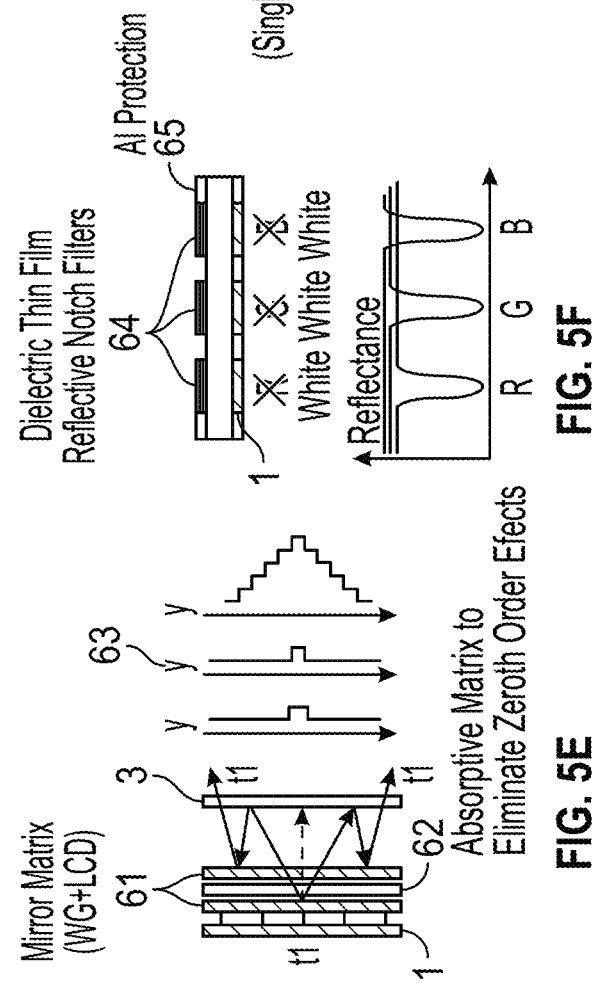

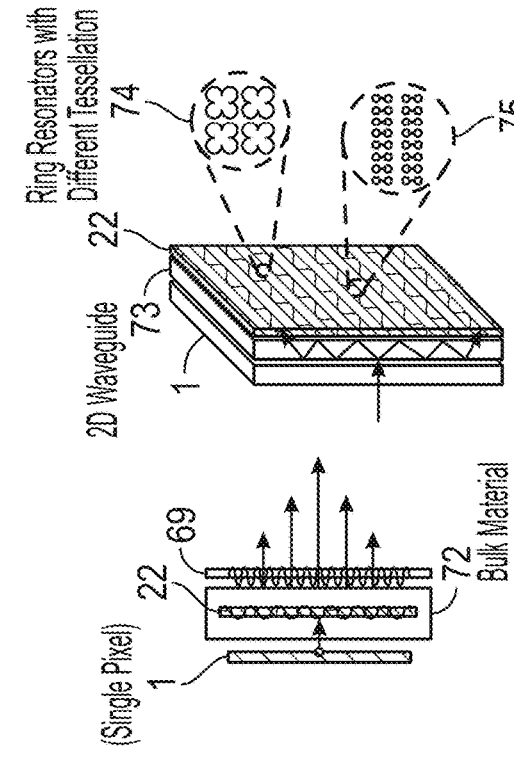
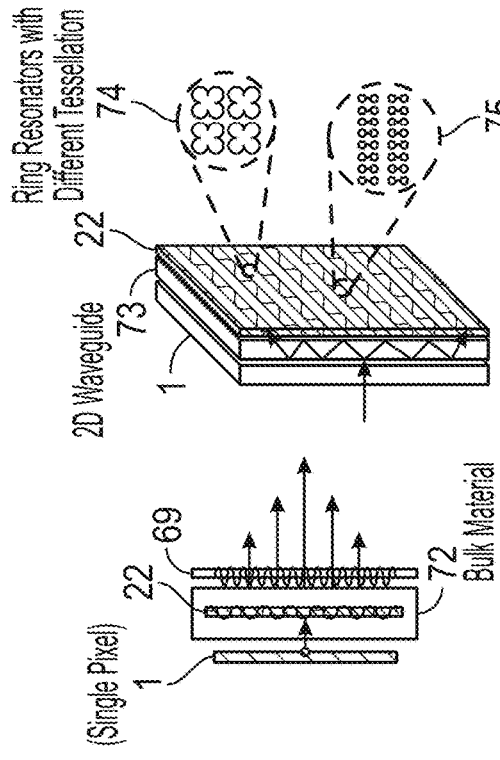
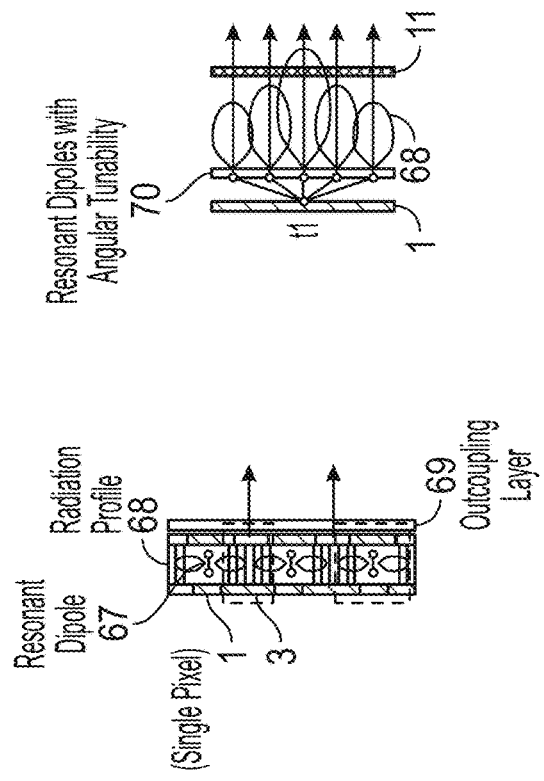
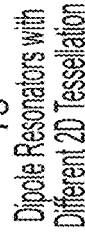
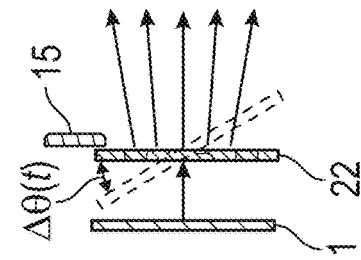
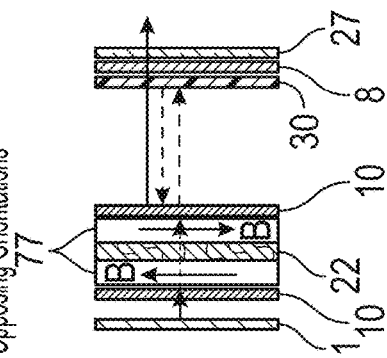
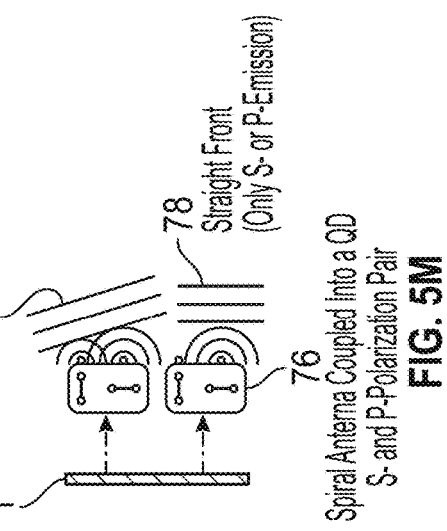

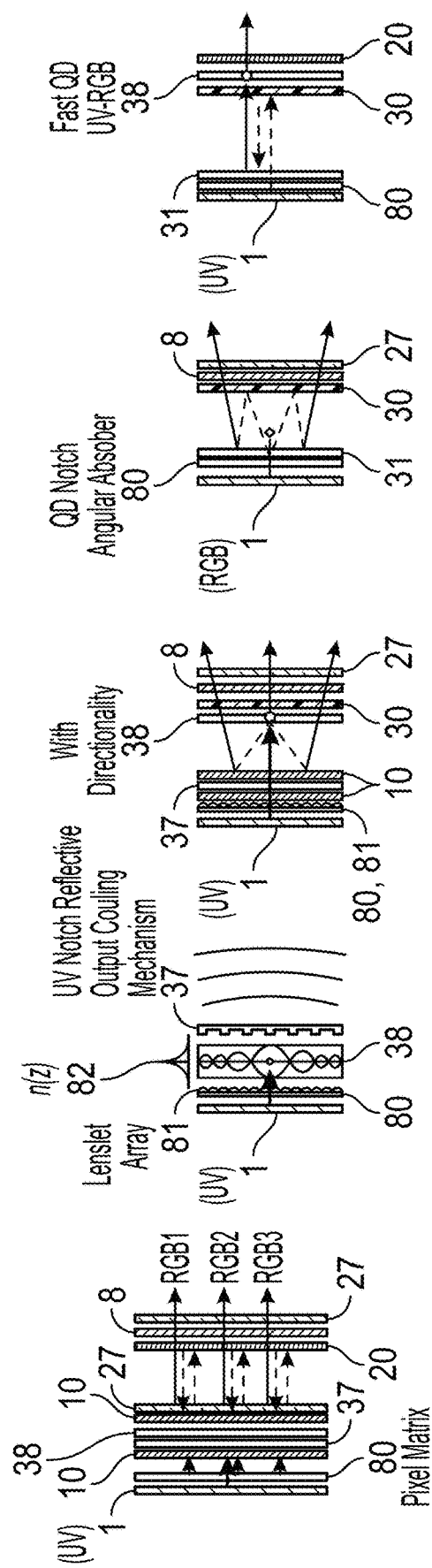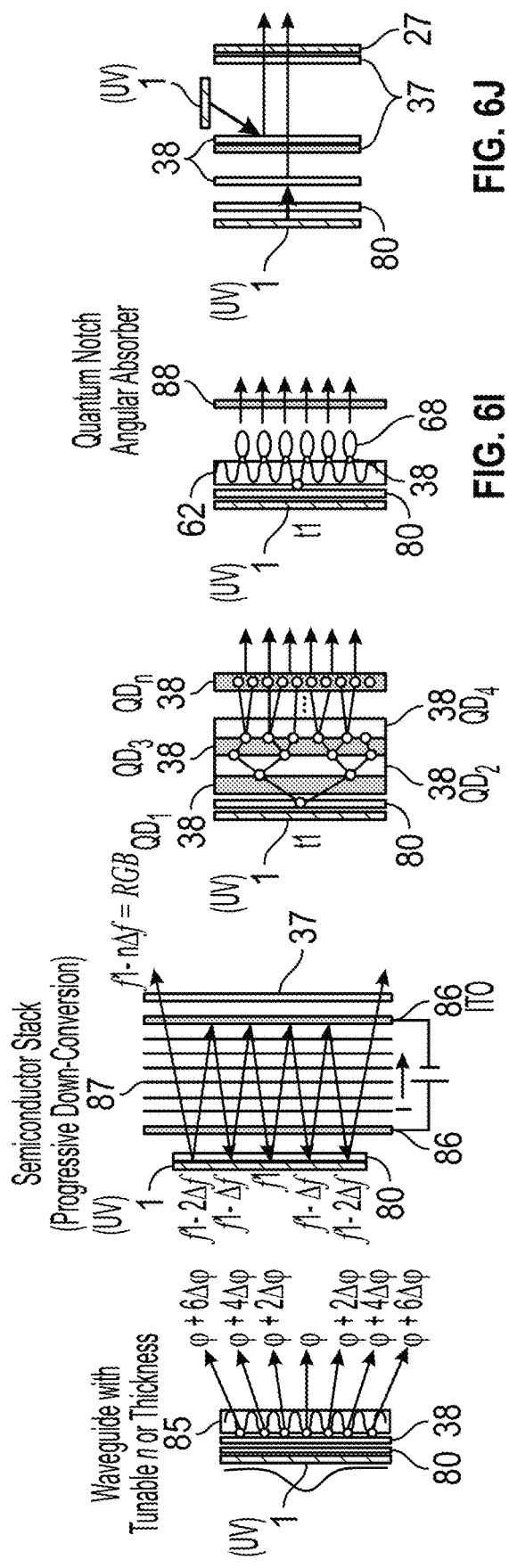

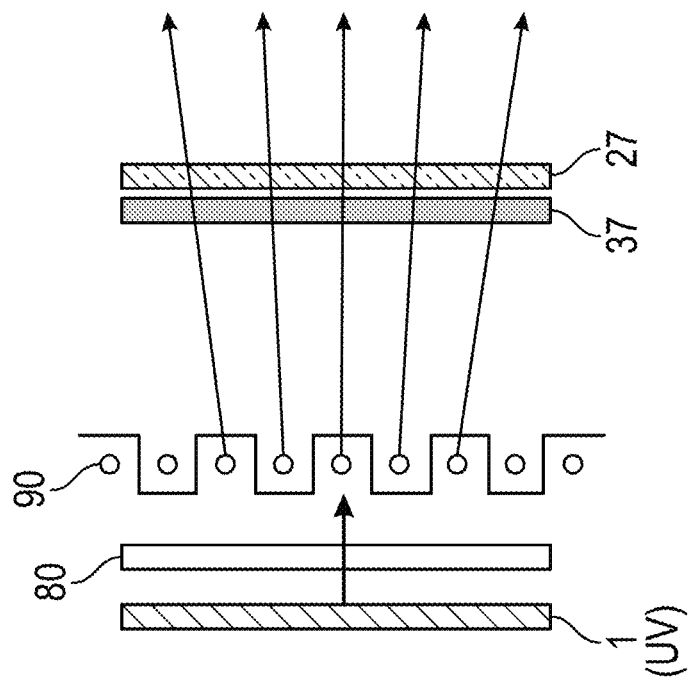
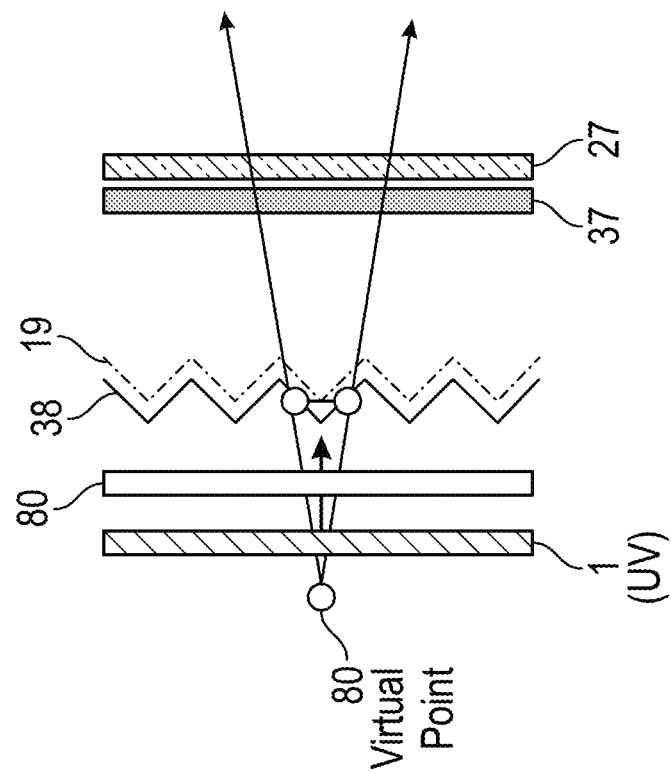
FIG. 6K
FIG. 6L

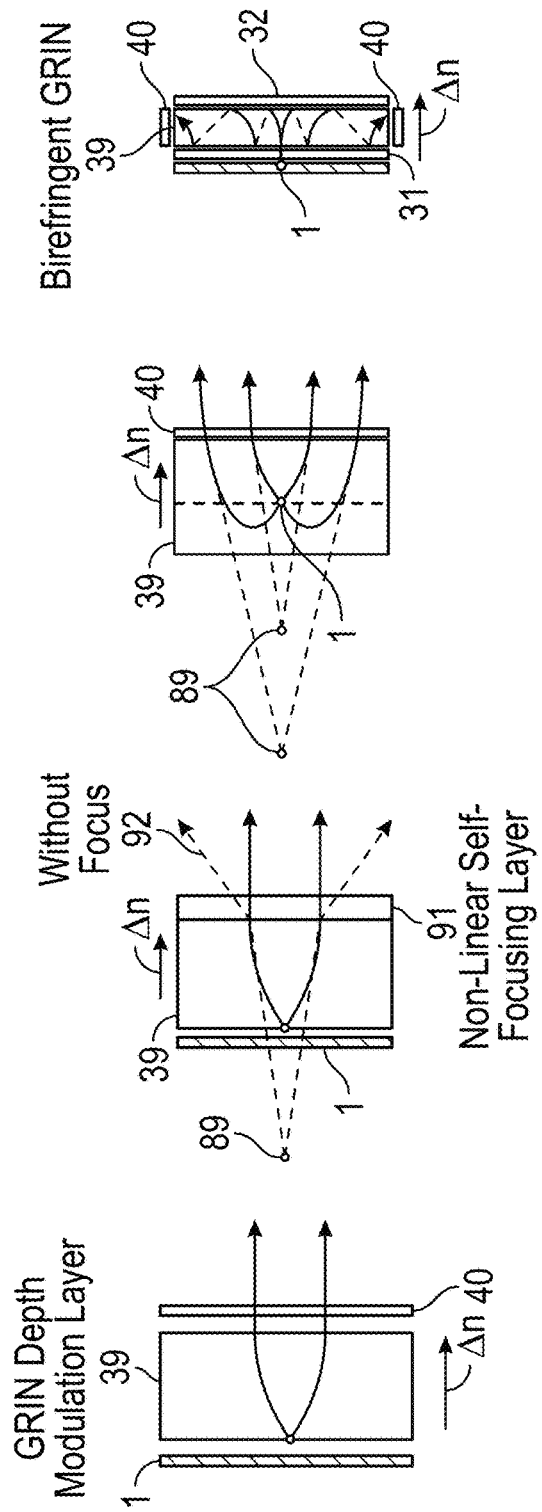

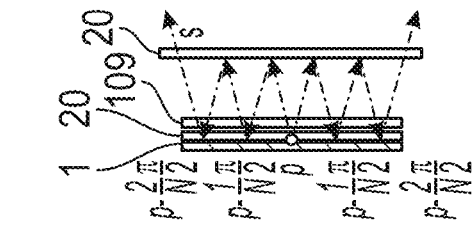
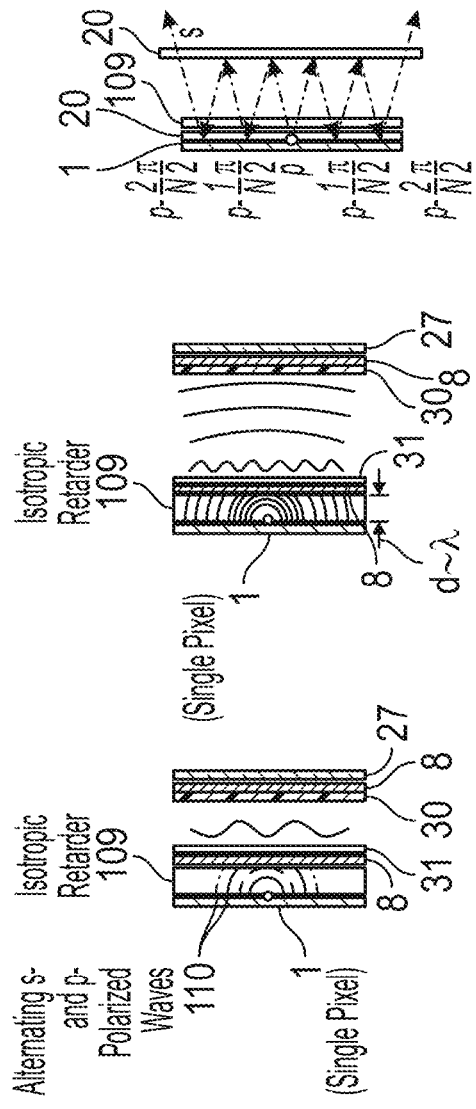
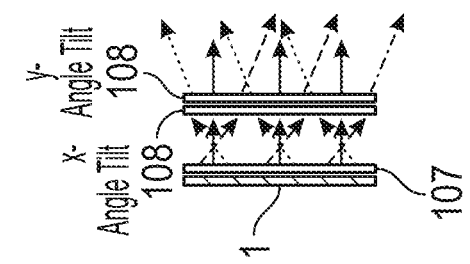
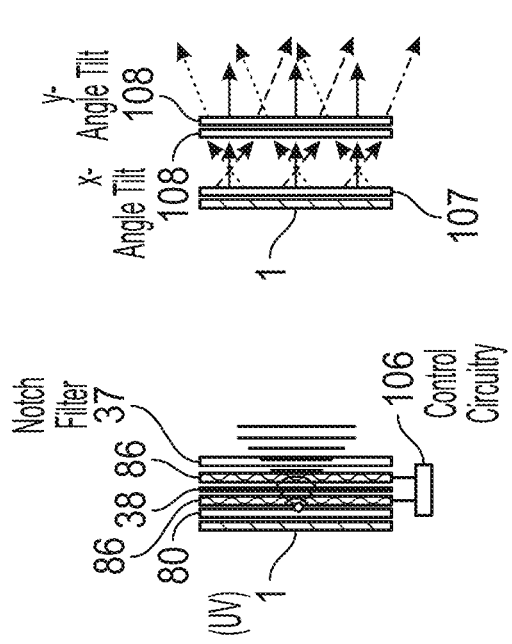
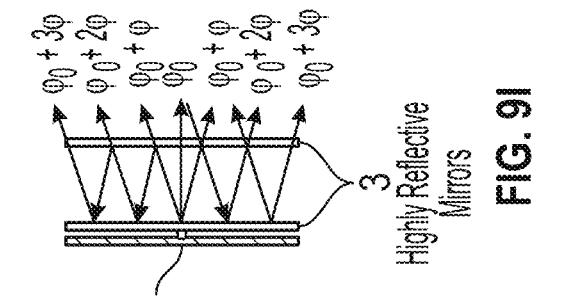
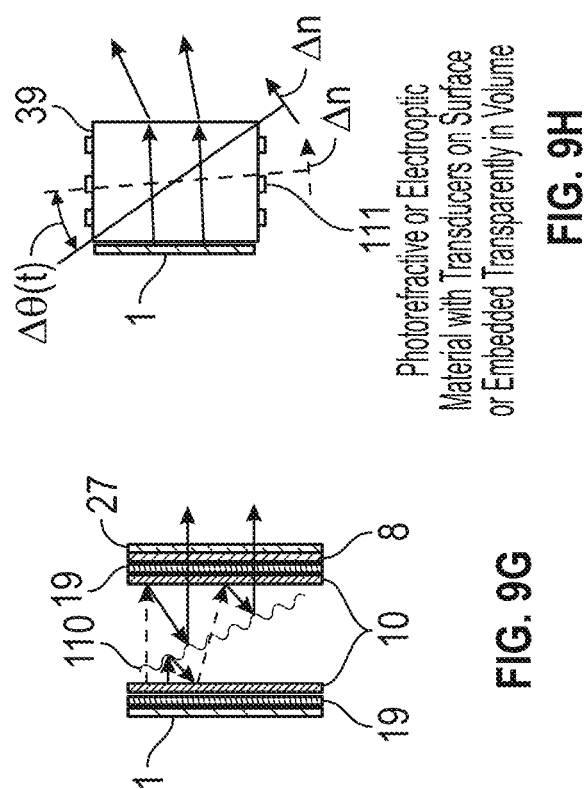

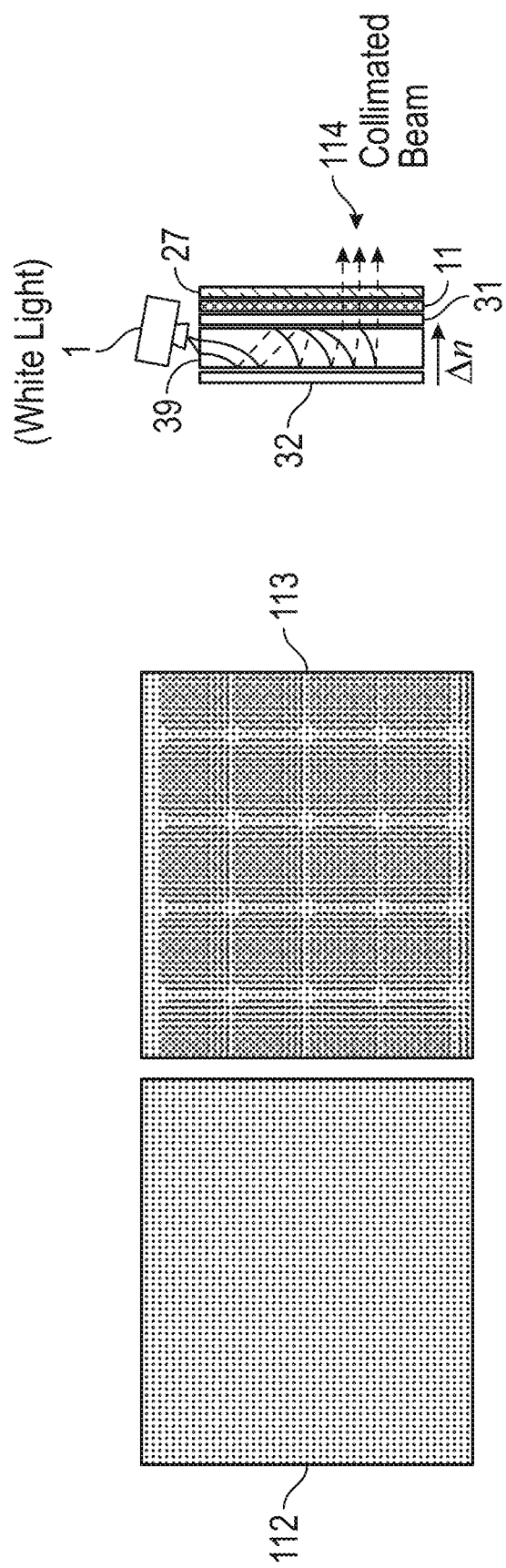
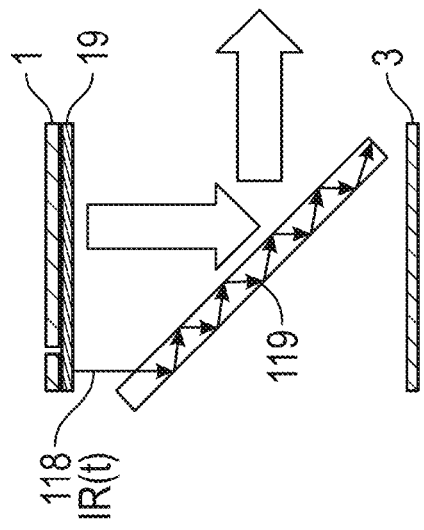
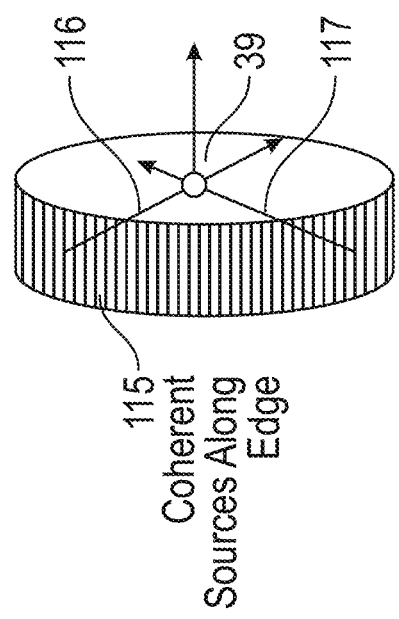

METHODS AND SYSTEMS FOR PROGRAMMING MOMENTUM AND INCREASING LIGHT EFFICIENCY ABOVE 25% IN FOLDED OPTICS AND FIELD EVOLVING CAVITIES

TECHNICAL FIELD

The present disclosure relates generally to optical displays and optical imaging apparatuses and, more specifically, to modulating optical wave properties, such as wavefront and angular distribution, with high efficiency. The disclosure proposes four families of methods to increase light efficiency of folded optics, such as pancake optics, to above 25% and to provide wavefront control deeper than one round trip of a cavity. More specifically, the families use a set of periodic resonant structures, quantum luminescence mechanisms, axial refractive index variations, and temporal encoding mechanisms to realize deeper, brighter wavefront programming in a thinner formfactor. The disclosure allows for the elimination of the circular symmetry needed in most lens-based systems and therefore allows for infinite-aperture wavefront programming. The disclosure then applies these methods to demonstrate lightfield displays and imaging systems.

BACKGROUND OF THE INVENTION

In today's society, there has been increasing movement towards more immersive lightfield and/or autostereoscopic three-dimensional (3D) displays due to advancement in electronics and microfabrication. 3D display technologies, such as virtual reality (VR) and augmented reality (AR) headsets, are often interested in presenting to a viewer an image that is perceived at a depth far behind the display device itself. A series of refractive elements can produce such an image, though at the expense of increased bulk and potential optical aberrations.

SUMMARY OF THE INVENTION

One way to mitigate the above-identified shortcomings is to implement an optical cavity, or folded optical system, with multiple reflective surfaces. For example, a pancake system is one in which the polarization state of light is rotated to allow for multiple reflections between semi-reflective surfaces before exiting to the viewer. In this way, the light travels a longer physical distance between the display surface and the exit face of the device, whereas the device can maintain a thinner form factor. However, the pancake system is inefficient: at each reflection from each semi-reflective surface, half of the light is wasted. With two such reflections, this corresponds to a maximum light efficiency of 25%. Similarly, in unpolarized birdbath-style optics, the light strikes a semitransparent beam splitter twice for a similar efficiency of 25%.

Recent advances in display technology make use of folded optical cavities and concentric lightfield technology to create large field-of-view (FOV) immersive 3D displays. Concentric lightfield displays provide depth perception to the users at the monocular level or at different focal planes by manipulating optical wavefronts by using field evolving cavities (FECs). This mechanism enables optical depth modulation, effectively eliminates the accommodation-vergence mismatch for comfortable viewing, and significantly reduces user eye stress and fatigue. Building on previous concepts, the present disclosure provides display systems, including pancake-style systems, that offer light efficiency beyond 25% by combining folded optical systems, such as FECs or pancake systems, with active-material elements, resonant elements, quantum luminescence elements, and axially-varying refractive materials. The disclosure also provides descriptions of folded optics with wavefront-, frequency-, or time-modulated features. These example embodiments further offer ways of focusing or generally modulating light transverse to the optic axis by using elements that are transverse-invariant, such that the optical momentum is directed in an engineered way. Unlike optics with circular symmetry, such as metalenses and refractive lenses, the methods disclosed here allow desired wavefront programming in an unlimited aperture size. The disclosure further provides apparatuses such as lightfield displays and imaging systems that use these methods to provide or capture depth.

Conventional imaging and display components that have circularly-symmetric optical elements have several well-known drawbacks. To provide optical focusing power, geometric lenses induce chromatic aberration and image distortion, and they are bulky and heavy, such that they are not scalable to large systems. Metalenses are thin, but they are more expensive to make in larger sizes and still require, similar to other circularly-symmetric lenses, physical optical distance to function properly.

The pancake system solves some of these problems, such as chromatic aberrations, but it comes at the cost of being inefficient: it loses significant light energy, and, due to orthogonality of polarization states, it does not allow more than one round trip without leakage. It still has distortion from geometrical curvature, and it is aperture-limited in that the thickness increases with aperture size as the area is increased. These drawbacks limit manufacturing ease and performance.

The large-scale wavefront engineering methods disclosed herein enable large-scale displays with true optical and stereoscopic depth. They also allow, for example, telescopes to capture better images, and better light collection for microscopy and other imaging apparatuses in ways that are independent to standard aperture/focal-length tradeoff. They also offer improved AR, VR, and lightfield displays with less eye fatigue and more realism.

Embodiments of the present disclosure utilize structures that are resonant with the display light, whereby the light energy can be channeled into a useful signal for the viewer or user so that the light efficiency is increased. Similarly, in quantum-based embodiments, adding layers of quantum-luminescent structures is optically efficient. The coupling between the light source and both types of structures bypasses semi-reflective surfaces, such that less light energy is lost as the light travels through a system. Both types of embodiments offer new methods of wavefront control by impacting the polarization or the wavefront curvature through engineering the properties of these elements, and, further, this control can be enhanced with multiple layers to amplify the effects. Similarly, the axially-refractive families disclosed here offer increased light collection in ways that are invariant to the transverse location of the display pixels, such that manufacturing costs and upward scalability are improved compared to existing circularly-symmetric systems. Wavefront engineering at a large scale with these features can also be designed to fold light multiple times, corresponding to deeper virtual depths.

This disclosure provides a description of the elements and smaller subsystems used in different embodiments of the disclosure to create a glossary. These elements and subsystems are included in the four main architectures for engineering the optical wavefront to adjust the depth of the virtual images: (i) cavity design using resonant apertures, (ii) luminescent markers such as quantum dots for wavelength conversion, (iii) refractive index variation for alternative methods of collecting and diffracting the lightfield, and (iv) time- or wavefront-modulation methods. Next, system-configuration block diagram representations describing the content depth-layer mapping approach for both display and imaging applications of such cavities are provided. Embodiment trees or sub-embodiments for each of the four architectures are then disclosed, as is a performance analysis for different approaches to realize some embodiments. Also disclosed here are the applications of these embodiments for methods of displays with Radon-type structures, vertical cavities, and locally varying structures periodic arrays, and for confocal imaging embodiments.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIGS. 3A-3D illustrate perspective views of four example embodiments for the present disclosure using (i) resonant apertures and frequency gating mechanisms (FIG. 3A), (ii) quantum-dot luminescence (FIG. 3B), (iii) refractive index variation (FIG. 3C), and (iv) time-modulated cavities (FIG. 3D).

FIGS. 5A-5P illustrate a set of side views of example embodiments using the resonant-aperture concept illustrated in FIG. 3A in multiple configurations and with various elements.

FIGS. 6A-6L illustrate a set of side views of example embodiments with quantum dots, as described in FIG. 3B.

FIGS. 7A-7I illustrate a set of side views of example embodiments of the cavities with non-uniform refractive indices, originally illustrated in FIG. 3C.

FIGS. 9A-9I illustrate a set of side views of example embodiments using generalized time-modulated architectures, as originally illustrated in FIG. 3D.

FIGS. 10A-10D illustrate a set of auxiliary embodiments with Radon-type structures, vertical cavities, and locally varying structures, periodic arrays, and an embodiment for use in confocal imaging systems. These are non-limiting examples of apparatuses and systems using disclosed technology to provide or capture depth by impacting the wavefront of the light.

Figure 1:
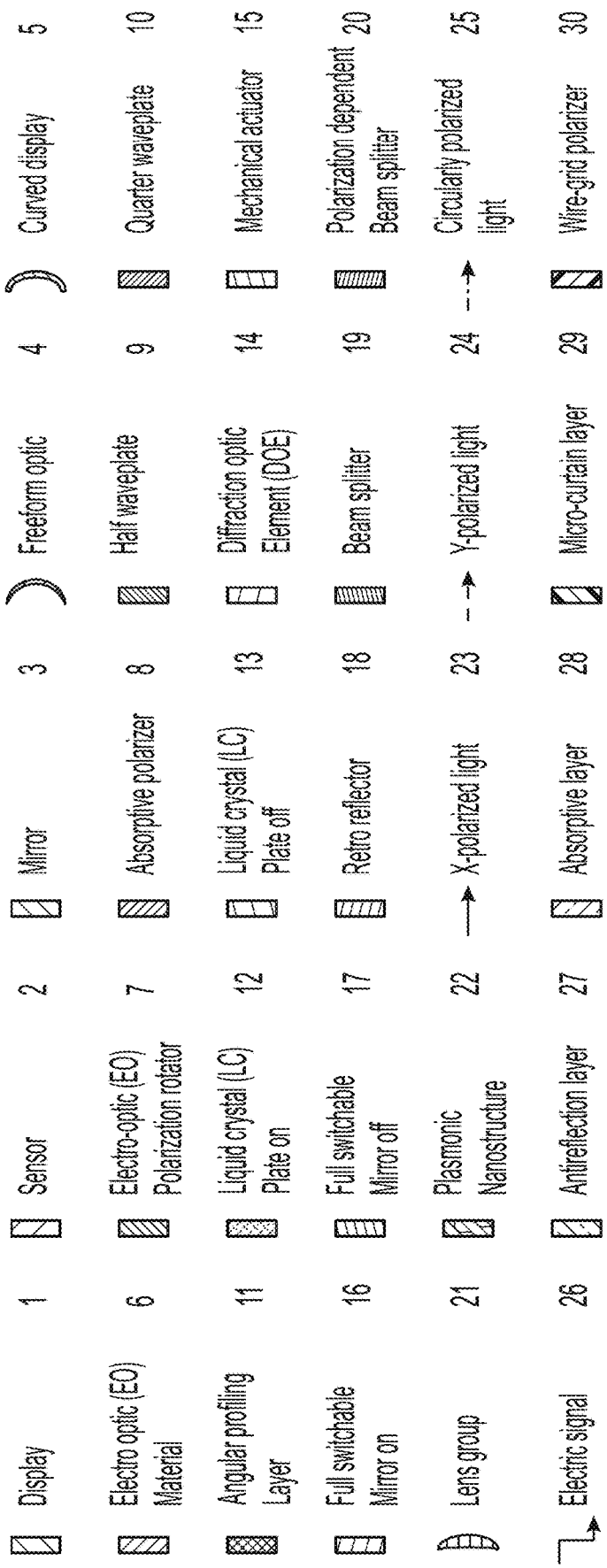
FIG. 1 illustrates the set of elements that compose the various embodiments of wavefront impacting components and systems described in this disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAIL DESCRIPTIONS OF THE INVENTION

In this description, references to an "embodiment," "one embodiment" or similar words or phrases mean that the feature, function, structure, or characteristic being described is an example of the technique introduced herein. Occurrences of such phrases in this specification do not necessarily all refer to the same embodiment. On the other hand, the embodiments referred herein also are not necessarily mutually exclusive. All references to "user," "users," "observer," or "viewer" pertain to either individual or individuals who would use the technique introduced here. All illustrations and drawings describe selected versions of the present disclosure and are not intended to limit the scope of the present disclosure.

Additionally, throughout this disclosure, the term "arbitrarily engineered" refers to being of any shape, size, material, feature, type or kind, orientation, location, quantity, components, and arrangements of single components or arrays of components that would allow the present disclosure, or that specific component or array of components, to fulfill the objectives and intents of the present disclosure, or of that specific component or array of components, within the disclosure.

As used herein, the term "optically coupled" refers to one element being adapted to impart, transfer, feed, or direct light to another element directly or indirectly.

In this disclosure, the "lightfield" at a plane refers to a vector field that describes the amount of light flowing in every or several selected directions through every point in that plane. The lightfield is the description of the angles and intensities of light rays traveling through or emitted from that plane.

In this disclosure a "fractional lightfield" refers to a subsampled version of the lightfield such that the full lightfield vector field is represented by a finite number of samples in different focal planes and/or angles.

In this disclosure, "depth modulation" refers to the change, programming, or variation of monocular optical depth of the display or image. "Monocular optical depth" is the perceived distance, or apparent depth, between the observer and the apparent position of the source of light. It equals the distance to which an eye focuses to see a clear image. An ideal point source of light emits light rays equally in all directions, and the tips of these light rays can be visualized as all lying on a spherical surface, called a wavefront, of expanding radius. When an emissive light source (e.g., an illuminated object or an emissive display) is moved farther away from an observer, the emitted light rays must travel a longer distance and therefore lie on a spherical wavefront of larger radius and correspondingly smaller curvature, i.e., the wavefront is flatter. This reduction in the curvature is perceived by an eye or a camera as a farther distance, or deeper depth, to the object. Monocular optical depth does not require both eyes, or stereopsis, to be perceived. An extended object can be considered as a collection of ideal point sources at varying positions and as consequently emitting a wavefront corresponding to the sum of the point-source wavefronts. Evolution of a wavefront refers to changes in wavefront curvature due to optical propagation.

In this disclosure, the term "display" refers to an "emissive display," which can be based on any technology, including, but not limited to, liquid crystal displays (LCD), thin-film transistor (TFT), light emitting diode (LED), organic light emitting diode arrays (OLED), active matrix organic light emitting diode (AMOLED), plastic organic light emitting diode (POLED), micro organic light emitting diode (MOLED), or projection or angular-projection arrays on flat screens or angle-dependent diffusive screens or any other display technology and/or mirrors and/or half-mirrors and/or switchable mirrors or liquid crystal sheets arranged and assembled in such a way as to exit bundles of light with a divergence apex at different depths or one depth from the core plane or waveguide-based displays. The display may be an autostereoscopic display that provides stereoscopic depth with or without glasses. It might be curved or flat or bent or an array of smaller displays tiled together in an arbitrary configuration. The display may be a near-eye display for a headset, a near-head display, or far-standing display. The application of the display does not impact the principle of this disclosure.

An "addressable matrix" or "pixel matrix" is a transmissive element divided into pixels that can be individually controlled as being ON, to transmit light, or OFF, to prevent light from passing, such that a light source passing through it can be modulated to create an image. The examples of displays above include such matrix elements.

As used herein, the "aperture of a display system" is the surface where the light exits the display system toward the exit pupil of the display system. The aperture is a physical surface, whereas the exit pupil is an imaginary surface that may or may not be superimposed on the aperture. After the exit pupil, the light enters the outside world.

As used herein, the "aperture for imaging systems" is the area or surface where the light enters the imaging system after the entrance pupil of the imaging system and propagates toward the sensor. The entrance pupil is an imaginary surface or plane where the light first enters the imaging system.

As used herein, the term "chief ray" refers to the center axis of the light cone that comes from a pixel or a point in space through the center of the aperture.

As used herein, the terms "field evolving cavity" or "FEC" refer to a non-resonant (e.g., unstable) cavity that allows light to travel back and forth within its reflectors to evolve the shape of the wavefront associated with the light in a physical space. One example of an FEC may comprise two or more half-mirrors or semi-transparent mirrors facing each other and separated by a distance. As described herein, an FEC may be parallel to a display plane (in the case of display systems) or an entrance pupil plane (in the case of imaging systems). An FEC may be used for changing the apparent depth of a display or of a section of the display. In an FEC, the light bounces back and forth, or circulates, between the facets of the cavity. Each of these propagations is a pass. For example, suppose there are two reflectors for the FEC, one at the light source side and another one at the exit side. The first instance of light propagating from the entrance reflector to the exit reflector is called a forward pass. When the light, or part of light, is reflected from the exit facet back to the entrance facet, that propagation is called a backward pass, as the light is propagating backward toward the light source. In a cavity, a round trip occurs once the light completes one cycle and comes back to the entrance facet. FECs can have infinitely many different architectures, but the principle is always the same. A FEC as defined previously is an optical architecture that creates multiple paths for the light to travel, either by forcing the light to go through a higher number of round trips or by forcing the light from different sections of the same display to travel different distances before the light exits the cavity. If the light exits the cavity perpendicular to the angle it has entered the cavity, the FEC is referred to as an off-axis FEC or a "FEC with perpendicular emission."

The term "concentric light field," or "curving light field," as used herein means a lightfield for which, for any two pixels of the display at a fixed radius from the viewer (called "first pixel" and "second pixel"), the chief ray of the light cone emitted from the first pixel in a direction perpendicular to the surface of the display at the first pixel intersects with the chief ray of the light cone emitted from the second pixel in a direction perpendicular to the surface of the display at the second pixel. A concentric lightfield produces an image that is focusable to the eye at all points, including pixels that are far from the optical axis of the system (the center of curvature), where the image is curved rather than flat, and the image is viewable within a specific viewing space (headbox) in front of the lightfield.

As used herein, the term "round trips" denotes the number of times that light circulates or bounces back and forth between the entrance and exit facets or layers of a cavity.

Throughout this disclosure, "angular profiling" is the engineering of light rays to travel in specified directions. Angular profiling may be achieved by holographic optical elements (HOEs), diffractive optical elements (DOEs), lenses, concave or convex mirrors, lens arrays, microlens arrays, aperture arrays, optical phase masks or amplitude masks, digital mirror devices (DMDs), spatial light modulators (SLMs), metasurfaces, diffraction gratings, interferometric films, privacy films, or other methods.

"Intensity profiling" is the engineering of light rays to have specified values of brightness. It may be achieved by absorptive or reflective polarizers, absorptive coatings, gradient coatings, or other methods.

The color or "wavelength profiling" is the engineering of light rays to have specified colors, or wavelengths. It may be achieved by color filters, absorptive notch filters, interference thin films, or other methods.

"Polarization profiling" is the engineering of light rays to have specified polarizations. It might be achieved by metasurfaces with metallic or dielectric materials, micro- or nano-structures, wire grids or other reflective polarizers, absorptive polarizers, quarter-wave plates, half-wave plates, 1/x waveplates, or other nonlinear crystals with an anisotropy, or spatially profiled waveplates. All such components can be arbitrarily engineered to deliver the desired profile.

As used herein, "arbitrary optical parameter variation" refers to variations, changes, modulations, programing, and/or control of parameters, which can be one or a collection of the following variations: optical zoom change, aperture size or brightness variation, focus variation, aberration variation, focal length variation, time-of-flight or phase variation (in the case of an imaging system with a time-sensitive or phase-sensitive imaging sensor), color or spectral variation (in the case of a spectrum-sensitive sensor), angular variation of the captured image, variation in depth of field, variation of depth of focus, variation of coma, or variation of stereopsis baseline (in the case of stereoscopic acquisition).

Throughout this disclosure, the terms "active design," "active components," or, generally, "active" refer to a design or a component that has variable optical properties that can be changed with an optical, electrical, magnetic, or acoustic signal. Electro-optical (EO) materials include liquid crystals (LC); liquid crystal as variable retarder (LCVR); or piezoelectric materials/layers exhibiting Pockel's effects (also known as electro-optical refractive index variation), such as lithium niobate (LiNbO3), lithium tantalate (LiTaO3), potassium titanyl phosphate (KTP), strontium barium niobate (SBN), and β-barium borate (BBO), with transparent electrodes on both sides to introduce electric fields to change the refractive index. The EO material can be arbitrarily engineered.

"Passive designs" or "passive components" refer to designs that do not have any active component other than the display.

Throughout this disclosure the "pass angle" of a polarizer is the angle at which the incident light normally incident to the surface of the polarizer can pass through the polarizer with maximum intensity.

Throughout this disclosure, a "reflective polarizer" is a polarizer that allows the light that has its polarization aligned with the pass angle of the polarizer to transmit through the polarizer and that reflects the light that is cross polarized with its pass axis. A "wire grid polarizer" (a reflective polarizer made with nano wires aligned in parallel) is a non-limiting example of such a polarizer.

An "absorptive polarizer" is a polarizer that allows the light with polarization aligned with the pass angle of the polarizer to pass through and that absorbs the cross polarized light.

Two items that are "cross polarized," are such that their polarization statuses or orientations are orthogonal to each other. For example, when two linear polarizers are cross polarized, their pass angles differ by 90 degrees.

A "beam splitter" is a semi-reflective layer that reflects a certain desired percentage of the intensity and transmits the rest of the intensity. The percentage can be dependent on the polarization. A simple example of a beam splitter is a glass slab with a semi-transparent silver coating or dielectric coating on it, such that it allows 50% of the light to pass through it and reflects the other 50%.

Throughout this disclosure, the "imaging sensor" may use "arbitrary image sensing technologies" to capture light or a certain parameter of light that is exposed onto it. Examples of such arbitrary image sensing technologies include complementary-symmetry metal-oxide-semiconductor (CMOS), single photon avalanche diode (SPAD) array, charge-coupled Device (CCD), intensified charge-coupled device (ICCD), ultra-fast streak sensor, time-of-flight sensor (ToF), Schottky diodes, or any other light or electromagnetic sensing mechanism for shorter or longer wavelengths.

Throughout this disclosure, the term "GRIN material," or "GRIN slab," refers to a material that possesses a graded refractive index, which is an arbitrarily engineered material that shows a variable index of refraction along a desired direction. The variation of the refractive index, direction of its variation, and its dependency with respect to the polarization or wavelength of the light can be arbitrarily engineered.

Throughout this disclosure, the term "quantum dot" (QD), or "quantum-dot layer," refers to a light source, or an element containing a plurality of such light sources, which are based on the absorption and emission of light from nanoparticles in which the emission process is dominated by quantum mechanical effects. These particles are a few nanometers in size, and they are often made of II-IV semiconductor materials, such as cadmium sulfide (CdS), cadmium telluride (CdTe), indium arsenide (InAs), or indium phosphide (InP). When excited by ultraviolet light, an electron in the quantum dot is excited from its valence band to its conduction band and then re-emits light as it falls to the lower energy level. In some embodiments, QDs can be excited via, for example, photoluminescence, electroluminescence, or cathodoluminescence.

The "optic axis" or "optical axis" of a display (imaging) system is an imaginary line between the light source and the viewer (sensor) that is perpendicular to the surface of the aperture or image plane. It corresponds to the path of least geometric deviation of a light ray.

Throughout this disclosure, "transverse invariance" or "transversely invariant" are terms that refer to a property that does not vary macroscopically along a dimension that is perpendicular to the optic axis of that element. A transversely invariant structure or surface does not have any axis of symmetry in its optical properties in macro scale.

As used herein, "imaging system" refers to any apparatus that acquires an image, which is a matrix of information about light intensity, phase, temporal character, spectral character, polarization, entanglement, or other properties used in any application or framework. Imaging systems include cell phone cameras, industrial cameras, photography or videography cameras, microscopes, telescopes, spectrometers, time-of-flight cameras, ultrafast cameras, thermal cameras, or any other type of imaging system.

The light efficiency or optical efficiency is the ratio of the light energy that reaches the viewer to the light energy emitted by an initial display.

This disclosure extends previous methods [2-7], which produce a single, continuous lightfield that enables simultaneous detection of monocular depth by each eye of a viewer who is positioned within the intended viewing region, where both the monocular depth can be greater than the physical distance between the display and the viewer, and where the apparent size of the display (as perceived by the viewer) is larger or smaller than the physical size of the display.

The methods in this disclosure can be used in arbitrarily engineered displays. These include, but are not limited to, large-scale lightfield displays that doesn't require glasses, systems that do require glasses, display systems that curve in front of the face and are closer to the user, lightfield displays with fractional lightfields, any type of head-mounted displays such as AR displays, mixed reality (MR) displays, VR displays, and both monocular and multifocal displays.

Further, the methods in this disclosure can be used in arbitrarily engineered imaging systems, including, but not limited to, microscopes, endoscopes, hyperspectral imaging systems, time-of-flight imaging systems, telescopes, remote imaging systems, scientific imaging systems, spectrometers, and satellite imagery cameras.

The basic elements of the embodiments for this disclosure are shown in FIG. 1. The components can be engineered arbitrarily.

Element 1 is the schematic representation of an emissive display.

Element 2 is the representation of a sensor; this can be an optical sensor, a camera sensor, a motion sensor, or generally an imaging sensor.

Element 3 is the schematic representation of a mirror, which can be a first-surface mirror, or second-surface mirror, or generally any reflective surface. The mirror could be reflective on any of its faces or on a plurality of them.

Element 4 is a freeform optic, which represents any freeform optic, convex or concave, or neither, expressed with spherical, elliptical, conjugate, polynomial, hyperbolic, or any other convex or concave, or arbitrary function.

Element 5 is the representation of a curved display.

Element 6 is the representation of an electro-optic material, such as an LC.

Element 7 represents an electro-optical polarization rotator, such that by variation of signal voltage applied to it, a linear polarization of light passing through it can be rotated to desired angle.

Element 8 is an absorptive polarizer, such that one polarization of the light passes through, and the perpendicular polarization of light is absorbed.

Element 9 is a half-wave plate (HWP), which produces a relative phase shift of 180 degrees between perpendicular polarization components that propagate through it. For linearly polarized light, the effect is to rotate the polarization direction by an amount equal to twice the angle between the initial polarization direction and the axis of the waveplate.

Element 10 is a quarter-wave plate (QWP), which produces a relative phase shift of 90 degrees. It transforms linearly polarized light into circularly polarized light, and it transforms circularly polarized light into linearly polarized light.

Element 11 is an angular profiling layer, which is an arbitrarily engineered layer to produce a specified angular distribution of light rays.

Element 12 is a liquid crystal (LC) plate that is switched "ON." In this state, the LC plate rotates the polarization of the light that passes through it.

Element 13 is a LC plate that is switched "OFF," such that in this "OFF" state, the state of the light polarization is unchanged upon transmission through the LC plate.

Element 14 is a diffractive optical element (DOE), which has microstructure to produce diffractive effects. The DOE can be of any material.

Element 15 is a mechanical actuator that can physically move the elements to which is connected via an electrical signal or other types of signals.

Element 16 is a full switchable mirror in the "ON" configuration. In this "ON" configuration, the mirror is reflective. The mirror can also be in a semitransparent state.

Element 17 is a full switchable mirror in the "OFF" configuration. In this "OFF" configuration, the mirror is transparent. The mirror can also be in a semitransparent state.

Element 18 is a retroreflector, which is a mirror that reflects light rays in the exact same directions along which they are incident. The retroreflector can be fabricated with microstructure such as microspheres, or micro-corner cubes, or metasurface stacks, or it can be a nonlinear element.

Element 19 is a beam splitter (BS), which partially reflects and partially transmits light. The ratio of reflected light to transmitted light can be arbitrarily engineered.

Element 20 is a polarization-dependent beam splitter (PBS). It reflects light of one polarization and transmits light of the orthogonal polarization. A PBS can be arbitrarily engineered and, for example, made using reflective polymer stacks, nanowire grids, or thin film technologies.

Element 21 is a lens group, which consists of at least one lens of arbitrary focal length, concavity, and orientation.

Element 22 is a plasmonic nanostructure. It is a metallic or electrically conducting material that can support plasmonic oscillations. It can have structure modulated on it, such as aperture arrays, or etched grooves, or corrugations.

Element 23 represents a light ray that is x-polarized. Its polarization direction is perpendicular to the plane of side-view embodiment sketches.

Element 24 represents a light ray that is y-polarized, orthogonal to Element 23. Its polarization direction is in the plane of the page of side-view sketches.

Element 25 represents a light ray that is circularly polarized. Such light contains both x- and y-polarized light, such that the two electric field components oscillate out of phase by 90 degrees. The resulting polarization direction traces out a circle as the light propagates. The circular polarization can be clockwise, or right-handed circular polarization (RCP), or counterclockwise, or left-handed circular polarization (LCP).

Element 26 represents an electrical signal that is used in the electrical system that accompanies the display system to modulate the optical elements or to provide feedback to the computer.

Element 27 is an antireflection layer (AR layer) that is designed to eliminate reflections of light incident on its surface.

Element 28 is an absorptive layer that ideally absorbs all incident light.

Element 29 is a micro-curtain layer that acts to redirect light into specified directions or to shield light from traveling in specified directions. A micro-curtain can be made by embedding thin periodic absorptive layers in a polymer or glass substrate, or it can be made by fusing thin black coated glass and cutting cross-sectional slabs.

Element 30 is a wire grid polarizer, which uses very thin metal wires aligned in a certain direction, which is its pass angle. A wire grid polarizer allows the transmission of light that is polarized along the pass angle, and it reflects cross polarized light. The wires can be deposited on a substrate or can be arranged in a free-standing manner. Element 30 can also be any type of reflective polarizer.

Figure 2:
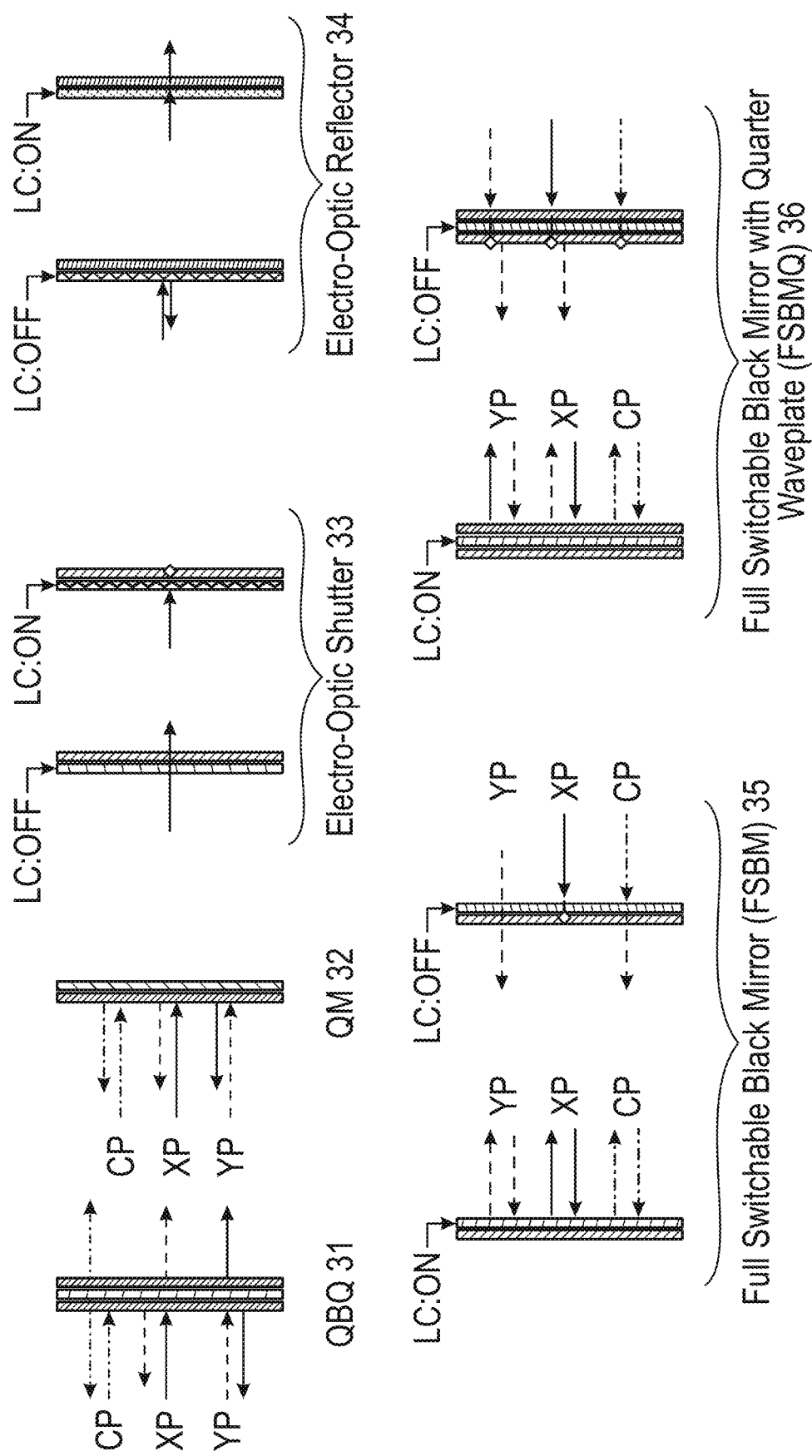
FIG. 2 illustrates various arrangements of the elements from FIG. 1 to produce different architectures of the folded-optical-display embodiments described in this disclosure.

The basic elements in FIG. 1 can be combined to produce functional elements or subassemblies or sub-systems, some of which are shown in FIG. 2.

Element 31 is a QBQ, which is a polarization-dependent element that comprises a first QWP, a beam splitter, and a second QWP. Incident light that is circularly polarized will be partially reflected as circularly-polarized light and partially transmitted as circularly-polarized light. Incident light that is x-polarized will be partially reflected as y-polarized light and partially transmitted as y-polarized light. Incident light that is y-polarized will be partially reflected as x-polarized light and partially transmitted as x-polarized light. A QBQ behaves similarly to a beam splitter for circularly polarized light. It is 50% efficient per pass.

Element 32 is a QM, which comprises a QWP layered on top of a mirror. It reflects all light, and it converts x-polarized light into y-polarized light and y-polarized light into x-polarized light. It does not change circularly polarized light. All the light energy is reflected.

Element 33 is an electro-optic shutter, which consists of an LC layer and an absorptive polarizer. When the LC is "ON," it rotates x-polarized incident light, such that the resulting y-polarized light is cross polarized with the absorptive polarizer and is absorbed by it. When the LC layer is "OFF," it leaves the x-polarization unchanged along the pass angle of the polarizer, which then transmits the light.

Element 34 is an electro-optic reflector, which consists of an LC layer and a PBS. When the LC layer is "ON," it rotates the incident y-polarization such that the resulting x-polarized light is aligned along the transmit orientation of the PBS. When the LC layer is "OFF," the light passing through is aligned such that it is reflected by the PBS, and its polarization is unchanged.

Element 35 is a full switchable black mirror (FSBM). In the "ON" state, the full switchable mirror reflects light of all polarizations. In the "OFF" state, the switchable layer and absorptive layer together extinguish x-polarized light, transmits y-polarized light, and transmits only the y-component of circularly-polarized light.

Element 36 is a full switchable black mirror with quarter-wave plate (FSBMQ) and consists of a FSBM with an added QWP layer. In the "ON" state, it reflects all light and interchanges x-polarized with y-polarized light. It reflects circularly-polarized light unchanged. In the "OFF" state, it extinguishes circularly polarized light, partially transmits y-polarized light with 50% of the light transmitted and converts x-polarized light into y-polarized light and transmits the result with 50% of the light transmitted.

FIGS. 3A through 3D depict a set of example embodiments that represent four architectures to increase the light efficiency of the display system. These displays have a set of preparation optics that can, in turn, have several alternative embodiments.

FIG. 3A illustrates a perspective view of an optical system embodiment that uses resonant structures. Light from a display panel (1) passes through a plasmonic nanostructure (22), which can be a masked resonant reflective coating. This plasmonic nanostructure (22) has a periodic structure modulated onto it for each color channel: red (R), green (G), and blue (B). It can be coated with metal such as aluminum or gold. The resonant structure is such that the incident light excites plasmons, which are then coupled to the guided modes of each aperture to produce extraordinary optical transmission, which resonantly enhances the optical throughput and increases the brightness and light efficiency. In some embodiments, the resonance can be produced through other types of notch filtering, structural filtering, or thin-layer filtering. In some embodiments of FIG. 3A a first QWP (10) before the resonant structure transforms the light from linear polarization to circular polarization before hitting the resonant structure. Some resonant structures automatically transform the polarization into circular polarization and the first QWP (10) is not necessary. The light travels through the cavity and through a second QWP (10), which transforms the light back into linearly polarized light, which is cross-polarized with, and therefore reflects from, a wire grid polarizer (30) or another reflective polarizer. The light travels a second pass back through the second QWP (10) and is subsequently reflected by the plasmonic nanostructure (22). It then travels a third pass through the second QWP (10). The double pass through the second QWP plate (10) has the effect of a HWP, which rotates the linear polarization to be along the pass angle of the wire grid polarizer (30). Then, it is transmitted through the absorptive polarizer (8) to remove any stray light before being viewed by the user. In some embodiments, the resonant structure will be randomized or quasi-periodic in order to neutralize diffractive effects. In some embodiments, a LC layer (12, 13) may be placed before the wire grid polarizer (30) to modify the allowed round trips within the cavity. Because the plasmonic nanostructure (22) acts like a mirror for the light on the second pass, the effect is that the light originally emitted by it is produced within the cavity itself. No beam splitting or semi-reflective mirror is required to couple light from the display (1) to the FEC, thus, improving the light efficiency to beyond 25% by eliminating one semi-reflective interaction.

FIG. 3B illustrates a perspective view of an optical system embodiment that uses quantum structures such as QDs. An example of a QD material is cadmium sulfide (CdS). A display panel (1) emits ultraviolet (UV) light through an addressable matrix (80), which passes through a first QWP (10) to convert the linear x-polarization into circular polarization. Then light then passes through a notch filter (37) that transmits the UV light and is reflective to RGB color channels. The UV light is absorbed by a QD layer (38) and is down-converted in frequency to RGB. The RGB light passes through a second QWP (10), which transform the circularly-polarized light into linear y-polarized light. The light goes through an AR coating (27) and hits a reflective polarizer, for example, a PBS (20), which reflects the y-polarization back to the cavity while it allows. The reflected light passes through the AR coating (27) and the second QWP (10), which transforms the light into circularly-polarized light, through the original QD layer (38), where it is subsequently reflected by the notch filter (27). On the third pass, the light travels through the elements again, and the second QWP (10) results in linearly polarized light that is passed by the PBS (20). The transmitted light goes through absorptive polarizer (8) to clean up stray rays, and through another AR layer (27) to the user. Here, again, the emissive QD layer is produced within the FEC to avoid coupling inefficiency between the display and a first semi-reflective surface of the FEC. Because no first beam splitting or semi-reflective mirror is required to couple light from the display (1) to the FEC, the light efficiency is greater than 25%.

The QD can be arbitrarily engineered. In these embodiments, they can be used for spectral frequency down-conversion from, e.g., UV to RGB color channels, or they can be used for spectral frequency up-conversion from, e.g., infrared (IR) to RGB color channels, or they can be used for incremental frequency shifts. QDs can emit or absorb directionally for angular profiling. They can be used to modify the polarization of the incident light, and their band gap properties can be arbitrarily modified with surrounding structures or geometry, such as core-shell nanocrystals or quantum well structures. They can be modified in their response times for time modulated embodiments with fast or slow QD.

Furthermore, in some embodiments, multiple layers of QDs can be cascaded, and any of these layers can have translational or segmented features to create quantum photonic crystals. These layers can be rotated or shifted relative to each other to create meta-atom structures for subwavelength lensing effects. Any quantum layer can be put in contact with transparent conductive layers to create a matrix that can impact quantum properties locally for each pixel. Any quantum-based material or phenomenon, such as two-dimensional materials like graphene, can be implemented in this way.

FIG. 3C illustrates a perspective view of an optical system embodiment that uses refractive index modulation or graded-index (GRIN) materials that vary in refraction along the optic axis. Light from a display panel (1) enters a GRIN material (39) and is then collected by a periodic subwavelength structure (40). This structure can be, for example, a photonic crystal, or it can be a set of nano-cone forest layers, or it can be a set of metasurface layers. These structures are all periodic in the transverse direction, and such a structure modifies the optical momentum through coupling with lattice momentum, such that the light rays are directed to the user. The GRIN material (39) acts to collect more light rays than would a free-space cavity, including light rays that are angled almost tangentially to the slab. The effect is a larger numerical aperture, similar to the effect of an oil-immersion lens in microscopy. Further, because higher-angled light rays are collected, the transverse resolution is improved.

Because the GRIN elements do not vary transverse to the optic axis, they do not limit the aperture of the system and do not suffer from the aperture/focal-length tradeoff. This property makes such systems a platform for unlimited-aperture design in wavefront programming.

FIG. 3D illustrates a perspective view of an optical system embodiment that modulates the wavefront in time or in frequency. It begins with light from a display (1) that travels through one or a plurality of internal resonant cavities (41). The resonant cavities have high light efficiency such that the light makes multiple round trips inside them. The thicknesses of the first resonant cavity and the second resonant cavity, and the distance between them are codesigned to maximize constructive interference for desired virtual points and to maximize deconstructive interference for unwanted virtual points. The rays that exit the system are consequently a superposition of multiple internal reflections and produce multiple virtual images.

Note that in all embodiments, any of the layers can also be geometrically curved in at least one dimension. Furthermore, all embodiments can be implemented in coaxial, non-coaxial, and off-axis geometries.

Figure 4A:
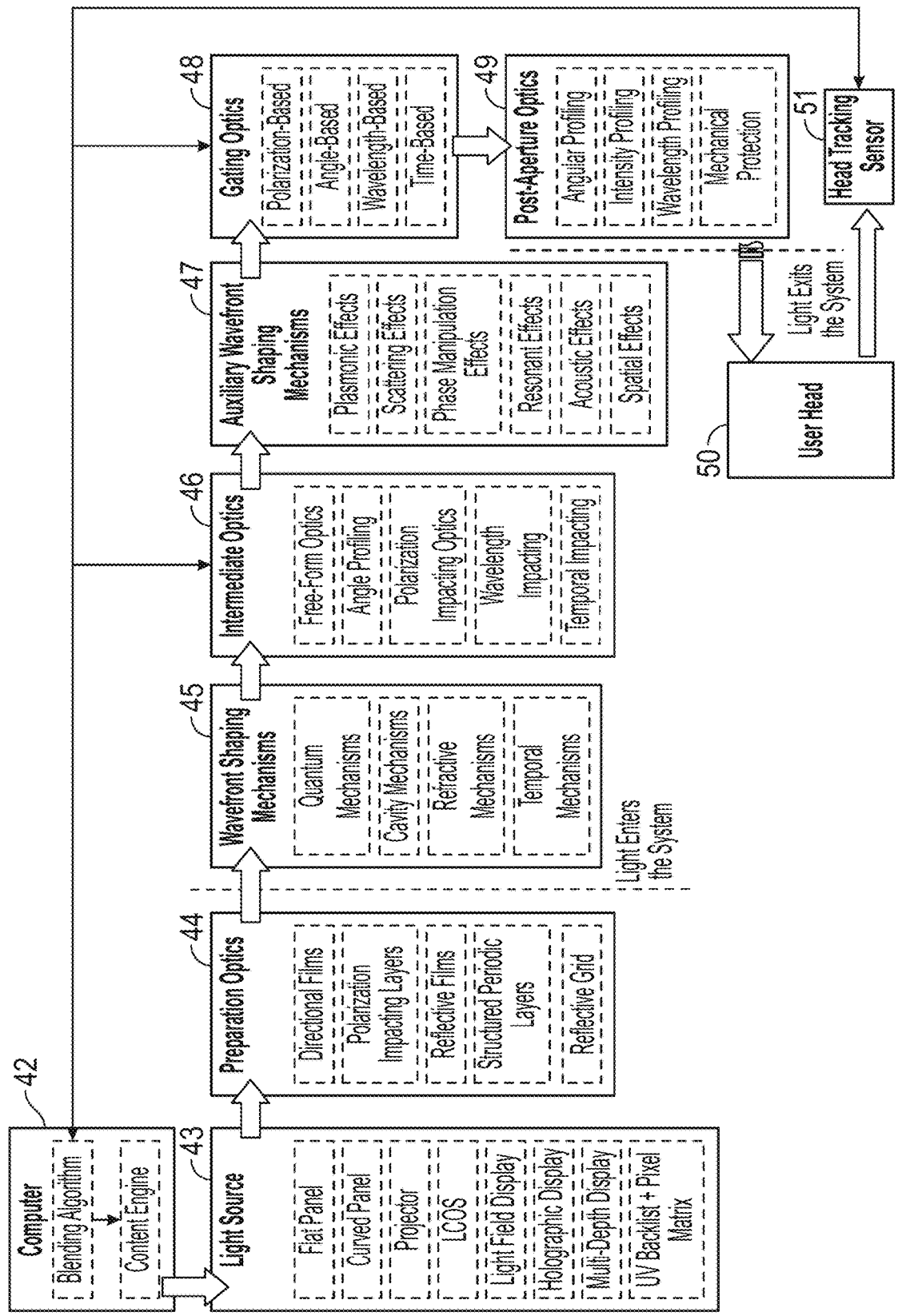
FIGS. 4A and 4B illustrate a block-diagram representations of the processes that take two-dimensional (2D) or 3D content and produce a 2D or 3D display with impacted wavefront, and the processes that record or image scenes into a computer through the disclosed wavefront-impacting components.

FIG. 4A illustrates a block-diagram representation of the processes that take 2D or 3D content and produce a three-dimensional display.

A computer (42) generates the information necessary to control a light source (43) using blending algorithms and content engines. The light source (43) includes, but is not limited to, a flat panel, a curved panel, a projector, an LCOS display, a light field display, a holographic display, a multi-depth display, or an ultraviolet (UV) backlight with a pixel matrix.

The light coming out of the light source (43) goes into a preparation optics (44) stage that prepares the light rays before they enter the system. Preparation includes, but is not limited to, polarization, intensity, or direction adjustments. The elements of this preparation stage (44) include, but are not limited to, directional films, polarization impacting layers, reflective films, structured periodic layers, or reflective grids.

Once the light rays enter the system, the rays go through a wavefront-shaping stage (45) that shapes the wavefront of the incoming light for further processing. These wavefront shaping mechanisms include, but are not limited to, quantum mechanisms, cavity mechanisms, refractive mechanisms, or temporal mechanisms.

The light rays coming out of the wavefront-shaping stage (45) go into an intermediate optics stage (46) that processes the rays before they go through an auxiliary wavefront-shaping stage (47). The intermediate optics stage (46) includes, but is not limited to, freeform optics, angle profiling layers, polarization-impacting optics, wavelength impacting layers, or temporal impacting layers.

The auxiliary wavefront-shaping stage (47) prepares the light rays to be directed to the user. These auxiliary wavefront-shaping mechanisms eliminate undesired effects introduced by the previous stages (44, 45, 46) before the light rays are sent to the gating optics stage (48).

The gating optics stage (48) controls both the locations where light rays exit the system and their timing. The gating optics stage (48) includes, but is not limited to, polarization-based gating, angle-based gating, wavelength-based gating, or time-based gating.

After the light rays leave the gating optics stage (48), but before they exit the system, they go into a post-aperture optics stage (49) that modifies and filters the wavefront to produce the final desired characteristics and to the signal-to-noise ratio (SNR) as well. The post-aperture optics (49) includes, but is not limited to, angular-profiling layers, intensity-profiling layers, wavelength-profiling layers, or mechanical protection.

The desired final optical wavefront exits the system at the desired location and angle, with the desired monocular depth, and it is shown in front of the user's head (50).

A head tracking sensor (51) feeds the user's head orientation and position to the computer (42) so that the computer can adjust the content and light source (43) for an optimal viewing experience.

The display system comprising any of the embodiments disclosed here can be worn on the body as a near-eye display, personal accessory, or it used far from the face, as in display devices like cell phones, tablets, viewers, view-finders, monitors, televisions, and automotive and vehicle-instrument clusters with virtual depth.

Figure 4B:
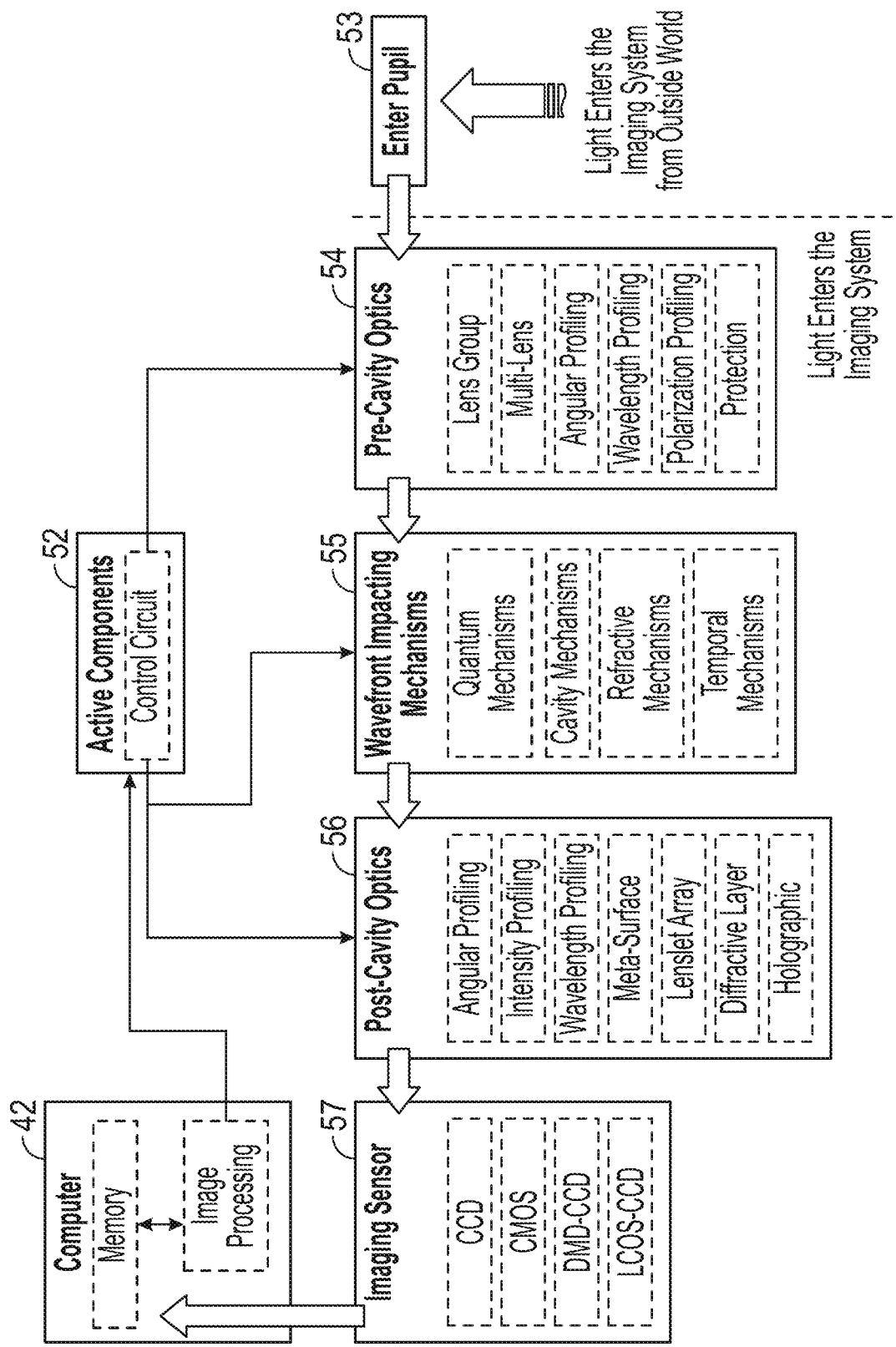

FIG. 4B illustrates a block-diagram representation of the processes that record three-dimensional scenes into a computer.

In this process, the computer (42) controls the circuit of an active-component control (52) stage, which controls the different optical components of the system.

The light enters the system through the entrance pupil (53) and then goes through a pre-cavity optics stage (54), which prepares the rays for the wavefront-impacting mechanisms (55) stage. The pre-cavity optics stage includes (54), but is not limited to, lens groups, multi-lens elements, angular-profiling layers, wavelength-profiling layers, polarization-profiling layers, or protection layers.

The wavefront-impacting mechanisms stage (55) modifies the wavefront of the light rays so that the information the light rays carry can be properly registered by the imaging sensor (57) later. The wavefront-impacting mechanisms stage (55) includes, but is not limited to, quantum mechanisms, cavity mechanisms, refractive mechanisms, or temporal mechanisms.

The light rays processed by the pre-cavity optics (54) and wavefront impacting mechanisms (55) go to the post-cavity optics stage (56), which filters the light rays to improve SNR and mitigate unwanted aberrations before the light rays are recorded by the imaging sensor (57). The post-fusion optics stage (56) includes, but is not limited to, angular-profiling layers, intensity-profiling layers, wavelength-profiling layers, meta-surfaces, lenslet arrays, diffractive layers, or holographic layers.

The imaging sensor (57) could be, but is not limited to, a CCD camera, a CMOS camera, a DMD-CCD camera, or an LCOS-CCD. The information provided by the imaging sensor (57) is registered by the computer (42), which processes and analyzes the captured image and adjusts the active components stage (52) to further optimize the capture process.

The embodiments described here can be used in imaging systems, such as microscopes, endoscopes, hyperspectral imaging systems, time-of-flight imaging systems, telescopes, remote imaging systems, scientific imaging systems, spectrometers, satellite imagery cameras, navigation imaging systems, spatial localization and mapping imaging systems, and 3D scanners and scanning systems. They can also be integrated into computing devices such as cellphones, tablets, viewers, viewfinders, monitors, televisions, and teleconferencing cameras with multi-focal or lightfield imaging capabilities.

FIGS. 5A through 5P depict side-view embodiments that rely on resonant structures.

The embodiment in FIG. 5A is a side view of FIG. 3A. Light from a display panel (1) travels through a first QWP (10) to convert the linear x-polarization from the display to circular polarization. The light subsequently travels through a nano-plasmonic structure layer (22), which could be a metallic layer with a periodic reflective coating. The light incident on the masked coating or masked reflective coating (22) couples surface plasmons to guided resonant aperture modes, which produce extraordinary optical transmission through the apertures. Three sets of resonant apertures radiate R, G, and B color channels. The plasmonic layer could be gold, or aluminum, or it could be other conducting materials. In some embodiments, the masked coating or reflective coating (22) produces circularly polarized light so that the first QWP (10) is not necessary. The light then travels through a second first QWP (10) that converts the polarization into linear y-polarization and is reflected by a cross-polarized reflective polarizer, such as a wire grid (30), which reflects the light back through the second QWP (10) such that the light is again circularly polarized. The light strikes the plasmonic nanostructure (22), which now reflects all the light back through the second first QWP (10). The light is converted into x-polarized light, travels through the wire grid (30), and through an absorptive polarizer (8), to remove stray light, to the user. An LC layer (12, 13), which could be voltage controlled, in front of the wire grid (30) can modify the number of round trips through the cavity. By including the resonant-aperture layer within the display, the light efficiency is over 25% compared to having only the first emissive display coupled to two semi-reflective surfaces.

In the alternative embodiment shown in FIG. 5B, each pixel in the plasmonic layer (22) is made of super-pixel cells (58), which are composed of vector-based sub-elements with different directional effects to reduce unwanted diffractive artifacts. The sub-elements can be resonators with different radiation patterns, or the same resonators oriented differently in a regular, random, or periodic pattern.

In the embodiment in FIG. 5C, the resonant plasmonic layer (22) is patterned with a set of random apertures (59) to reduce diffraction effects and to produce a more uniform intensity distribution. Different color channels can have different arrangements of apertures. The apertures can also be patterned with a quasi-periodic tiling for the same purpose. The quasi-periodic tiling can be, for example, a Penrose tiling or a Robinson tiling. The random structure layers are patterned on at least one 2D layer, or they can be patterned in a 3D slab.

In the embodiment in FIG. 5D, x-polarized light is emitted by a set of display pixels (1) that are interlaced with a first set of mirrors (3) into a glass slab (60). The light is then reflected by a second set of mirrors (3) and, consequently, experiences multiple reflections and is, consequently, guided transversely along the glass slab (60). The second set of mirrors (3) could be any reflective mask, such as a wire-grid-laminated LCD layer. The light exits the slab through apertures with an effectively wider geometric cross section, travels through the cavity, and is reflected and converted into y-polarization by a QBQ (31). The light then is reflected by the second set of mirrors (3) and travels through the QBQ (31), and through an absorptive polarizer (8) and through an AR layer (27) to the user. The light efficiency is at least 25%. Alternatively, a QWP (10) could be inserted in between the display pixels and the first set of mirrors, such that circularly-polarized light enters the cavity. Replacement of the QBQ (31) with a QWP (10) and wire grid polarizer (30) would let the light efficiency approach 100%.

FIG. 5E shows an embodiment where light from a display panel (1) travels through a mirror matrix (61), in which the light from a given pixel, t1, experiences multiple internal reflections to expand its geometric cross section. The mirror matrix (61) comprises a wire grid polarizer (30) and an LC layer (12, 13). Each matrix element can be programmed to be transparent or reflective. An angle-dependent internal absorptive matrix (62) can absorb normally incident light to eliminate the zeroth diffraction order. The inset (63) in FIG. 5E shows, first, an example of a single-pixel illumination signal versus the transverse axis (y); second, the zeroth-order diffraction signal to subtract out by way of, e.g., a programmable parallax barrier in the absorptive matrix (62); and third, the resulting intensity spreading via the mirror matrix (61). Because the zeroth-order light is removed, the signal-to-noise ratio increases also.

The embodiment in FIG. 5F uses white display light (1) that passes through three sets of dielectric thin-film notch filters (64) for the RGB color channels. An aluminum coating can serve as a protection layer (65). The inset graph illustrates the reflectance for each filter, and each notch indicates that that color channel is transmitted through the filter, with the rest of the light being reflected.

FIG. 5G shows an embodiment where the pixels from a display panel (1) are engineered for different illumination profiles. The pixel (66) could illuminate light in a null Bessel beam pattern, which does not have a central bright spot or zeroth diffraction order. Rather, the light is emitted in a hollow cone, such that the light energy is engineered to be concentrated along desired angles with less stray light and, therefore, more efficient optical throughput in the desired diffraction angles. Assuming the same total optical power is produced by the null pixel as by a standard pixel, the increased light efficiency corresponds to the ratio of the energy within approximately the full width at half maximum (FWHM) of a standard pixel as that energy is shifted into the tails.

FIG. 5H shows an embodiment in which light from a display panel (1) passes through a glass slab (60) and then through a set of periodically arranged tessellated reflectors (3). They could vary in geometric shape, and the tessellation can be triangular, hexagonal, or pyramidal. The geometry and orientation are engineered so that waveguiding reflections in the structure expand the geometric cross section of the light from each pixel and collimate the light to produce a broader beam and a deeper virtual image.

The embodiment in FIG. 5I depicts light from display pixels (1) exciting individual resonant dipoles (67) in microcavities bound by mirror segments (3). The resonant dipoles then radiate transverse to the cavity. The radiation profile (68) is guided transversely by the mirror segments (3) and coupled out to the user via leaky mode effects by a periodic structure outcoupling layer (69). The in-coupling of the incident display light to the cavity can be a resonant dipole or a leaky mode waveguide. The waveguide itself can be PMMA single- or multi-mode waveguides, or it can be a light-guide. The outcoupling mechanism can be a periodic structure inside the waveguide, or it can be a surface structure of nano-cones or a grating, or it can be a back-surface structure.

FIG. 5J depicts an embodiment where light from a display panel (1) is resonantly coupled to a set of nano-antennas radiators with angular tunability (70) that allow broad excitation and directional emission. The nano-antennas could be optical Yagi-Uda antennas, which accept light from multiple angles and have a directional output radiation profile (68). The result is that a single pixel experiences collimation over a wide geometric cross section. The light can then pass through an angular profiling layer (11), such as a directional absorber, to remove side lobes.

In the embodiment in FIG. 5K, light from a pixel of a display (1) excites a thin subwavelength plasmonic layer (22) inside a slab of material (72). The thin layer can be a gold layer, for instance. The plasmonic layer (22) excites a transverse mode via a periodic structure superimposed on it. The light continues to propagate transversely and a surface relief or periodic structure (69) on the right side outcouples light through a leaky-mode coupling mechanism.

The mechanisms for these embodiments can be implemented as shown in FIG. 5L, which depicts a display panel (1) emitting light into a two-dimensional transverse light-guide or waveguide (73). The light is then coupled to a plasmonic resonant pinhole array (22), which has a set of resonant structures. The resonators can be ring resonators with different tessellations (74), or they could be dipole resonators (75). The light that exits the array can then propagate through an FEC.

The embodiment in FIG. 5M shows an IR display panel (1) that emits circularly- or x-polarized light. The light strikes spiral antenna resonators (76) that are coupled to QD emitters, which absorb the IR light and emit visible light. The emission is polarization dependent, and the varying polarization induces phase shifts or delays that could tilt the wavefront (77) into different directions or maintain collimated light (78). The efficiency is limited by the conversion efficiency of the quantum dots.

The embodiment in FIG. 5N breaks Lorentz reciprocity by disposing a plasmonic nanolayer (22) in between two thin magneto-optical materials (79) with differing magnetic orientation. Inversion-symmetry breaking allows for one-way transmission from the display panel (1) through a first QWP (10) to convert the x-polarized light into circularly polarized light. The light passes through a first magneto-optical material (79), then a plasmonic nanostructure (22), and then a second magneto-optical layer (79). The light is then converted into y-polarized light after it passes through a second QWP (10). It is cross-polarized and therefore reflected by a wire-grid polarizer (30). The light then passes through the second QWP (10), is fully reflected by the magneto-optical/nanolayer structure (79, 22, 79), and then passes through the second QWP (10) again. The net result is to reflect the light to the right and convert the polarization into x-polarized light. Light then passes through the wire-grid polarizer (30), through an absorptive polarizer (8) and through an AR layer (27), to the user. For ideal elements, the efficiency approaches 100%.

In the embodiment of FIG. 5O, light from a display (1) strikes a nano-plasmonic structure layer (22), which is dithered with a mechanical actuator (72). The dithering can be in the angle of the layer with respect to the optic axis. Such random motion will mitigate unwanted diffraction artifacts and reduce chromatic aberration to provide a more faithful representation of the image content for the user. Alternately, as shown in FIG. 5P, the dithering by the actuator (15) can shift the nano-plasmonic layer (22) along a linear dimension perpendicular to the optic axis. Random motion will mitigate unwanted diffraction effects and reduce chromatic aberration.

FIGS. 6A through 6L depict a set of side views of embodiments that use QD or other quantum-based methods for enhanced efficiency.

FIG. 6A is a side view of the embodiment in FIG. 3B. A display emits UV light (1) that passes through an addressable pixel matrix (80) to create UV pixels. This pixelated UV light passes through a first QWP (10), to convert the light into circular polarization, and then through a UV-notch filter (37), which reflects RGB light. Then the UV light is absorbed by a layer of QDs (38), which emit RGB light. The RGB light travels through a second QWP (10), which transforms the light from circularly-polarized light into x-polarized light. The light then travels through an AR layer (27) and hits a cross-polarized reflective polarizer, such as a polarizing beam splitter (20), where the x-polarized light is reflected backward. Light travels a second pass as x-polarized light, through the antireflection layer (27), rotates into circular polarization through the second quarter-wave plate (10), and is reflected by the notch filter (37), which now acts as a mirror. Note, therefore, that the RGB pixels from the QD layer are inside the cavity, between the two reflective surfaces (10). The light then travels again through the second QWP (10), which transforms the light into y-polarization. This light goes through the first AR layer (27), through the polarizing beam splitter (20), through the absorptive polarizer (8) and a second AR layer (27) to remove any stray light, when it finally reaches the user. Sometimes, the UV light is variable so that a pixel UV1 creates visible color pixel RGB1, pixel UV2 creates visible color pixel RGB2, and pixel UV3 creates visible color pixel RGB3. Because the RGB light is within the cavity, a first semi-reflective surface is unnecessary, and the light efficiency is higher than 25% and is limited by the quantum dot conversion efficiency and any non-ideal character of any of the elements used.

In the embodiment in FIG. 6B, a UV display light (1) that emits light through a pixel matrix (80) is locally collimated by a lenslet array (81). The light enters a GRIN material with a varying refractive index (82) along the optic axis such that it has a waveguiding structure in the transverse direction. The GRIN slab includes a QD layer (38) embedded in it. A single QD region absorbs a single collimated UV light beam and emits RGB light that propagates transverse to the optic axis along the waveguiding structure (82). The light is then coupled out with an output coupling mechanism, such as a grating, with UV notch filtering (37) to reflect the UV light. The result is a QD pixel that is expanded in its geometric cross section and has a flattened wavefront.

FIG. 6C depicts an embodiment in which the UV light (1) passes through the pixel matrix (80) and is locally collimated by a lenslet array (81). The x-polarized light is converted into circular polarization from a first QWP (10). The light then travels through a UV-pass notch filter (37) that is reflective for RGB color channels. The light then passes through a second QWP (10) to convert the light back into horizontal, x-polarized light. The light is then reflected by a cross-polarized wire grid polarizer (30) upon down conversion to RGB by a directional QD layer (38), which absorbs the left-going UV light and produces left-going RGB light. The light then travels back through the second QWP (10), is reflected by the notch filter (37), and travels back through the second QWP (10) again. The result is linearly polarized light aligned with the pass angle of the wire grid polarizer (30). The light then travels through the wire grid polarizer, through an absorptive polarizer (8) and AR layer (27), to the user. In this embodiment, the UV experiences one pass through the cavity, and the RGB light experiences two passes (one round trip) so that the light experiences a total of three round trips through the cavity. The QD time response can be engineered arbitrarily to impact the wavefront in this way.

In the embodiment in FIG. 6D, an RGB display panel (1) emits visible light that travels through a QD notch angular absorber (80). The light traveling along the optic axis, i.e., the zeroth-order diffraction direction, is completely absorbed, and the light traveling at a nonzero angle is not absorbed. This reduces stray, zeroth order diffraction light and consequently improves the SNR. The light that passes through the absorber travels through a QBQ (31), which rotates the x-polarized light into y-polarized light. Light is reflected by a cross-polarized wire grid polarizer (30) and makes another round trip through the cavity. The second reflection from the QBQ (31) rotates the polarization back into x-polarized light, which passes through the wire grid polarizer (30), absorptive polarizer (8), and AR layer (27), to the user.

The embodiment in FIG. 6E emits light from a UV display light (1) through an addressable pixel matrix (80), then through a QBQ (31), such that the exiting light is y-polarized and cross polarized with a reflective polarizer, such as a wire grid (30). On the return pass, the light is reflected by the QBQ (31) and converted into x-polarized light, such that it aligns with the pass angle of the wire grid (30) and passes through it. Then the light is absorbed by a QD layer (38), which is engineered to have an ultrafast response time, so that it absorbs the UV light and emits RGB light coherently, preserving the wavefront of the collimated UV light after several reflections. In some embodiments, the polarization changes can be modified, or LC layers (12, 13) could be included to modify the number of round trips the light travels.

In the embodiment in FIG. 6F, a UV display panel light (1) emits light through an addressable pixel matrix (80). The light is absorbed and re-emitted by a QD layer (38) and coupled into a transverse waveguide slab (85) that can be modulated in its thickness or its refractive index. Upon each round trip, the light accumulates a phase $\Delta\varphi$ corresponding to the round-trip path length. The beam is expanded in its geometric cross section. To compensate for any phase distortion, the QD layer (38) can be engineered such that different QD have different response times, which produce wavefront variation with axial symmetry. Furthermore, the waveguide thickness or index modulation can be modulated with a voltage applied to an LC (12, 13) to control the expansion factor of the beam geometric cross section.

The embodiment in FIG. 6G includes a UV display panel (1) that passes through an addressable pixel matrix (80). An example pixel emits light at frequency $f_1$. As the light travels through the cavity, it passes through a set of at least one layer of semiconducting material (87) that is biased via transparent conductor layers such as indium-tin-oxide (ITO) (86). The conductor layer can be any transparent conducting oxide. As the light passes through the semiconductor layers (87), it is incrementally down-converted to lower a frequency, e.g., $f_1 - \Delta f$ for the first-round trip. The other end of the display includes a narrowband reflective filter (37) that transmits the light only after it is converted n times. A voltage bias or a current control determines the frequency step $\Delta f$ after traveling through the semiconducting layers (87). In this way, a voltage bias determines the number of round trips through the cavity. In some embodiments, the quantum layer is in contact with transparent conductive layers to create a matrix that can impact quantum properties locally for each pixel. The quantum material can be addressed and excited via quantum electroluminescence.

The embodiment in FIG. 6H depicts a UV display panel (1) that emits light through an addressable array (80), and through a set of N QD layers (38). Each layer absorbs and re-emits light from a pixel (t1) to produce a semi-collimated RGB beam as the re-emission of each subsequent layer broadens the geometric cross section. In some embodiments, the QD layers (38) can have masks or transverse structure to further engineer the wavefront. The cascaded layers also have translational features to create quantum photonic crystals. Further, the cascaded layers can be rotated graphene layers to create meta-atom structures to create subwavelength lensing effects.

In FIG. 6I, a UV display panel (1) emits light through an addressable array (80) into a 2D waveguide (62) that redirects the UV light transversely. The light is, therefore, spread out transversely, and each UV pixel (t1) couples to a set of QDs in a QD layer (38) that produces a more collimated beam. The light propagates through the FEC and passes through a quantum-notch angular absorber (88) to remove stray light in unwanted directions and produce a collimated RGB beam. The absorber can be a carbon nano-tube array.

FIG. 6J depicts a multi-depth-layer embodiment. A first UV display panel (1) on the left passes through an addressable pixel matrix (80) and illuminates a first QD layer (38). The light that passes through a first notch filter (37) that removes UV and allows RGB light to pass. This light travels through a second QD layer (38) that is coated with nano QD in a way to make it transparent to the first layer. A second UV display panel (1) illuminates the second QD layer (38), which emits light through the cavity in the same direction as the first QD layer (38). Both sets of light rays travel through a second notch filter (37) to remove UV light and, finally, through an AR layer (27), to the user.

In the embodiment in FIG. 6K, light from a UV display panel (1) passes an addressable pixel matrix (80) and through a foldable QD layer (38). Each corner represents a single viewing pixel. The angles of the folds are such that QD sections bounce light from neighboring sections, within each corner, which are coated with beam splitting material (19). The light is shaped into a more collimated beam with a deeper virtual depth and farther virtual point (89). The light then passes through a notch filter (37) that removes stray UV light and, through an AR layer (27), to the user.

FIG. 6L illustrates an embodiment in which the UV panel (1) emits light through an addressable pixel matrix (80) into a QD layer that is embedded in a plasmonic waveguiding structure (90). A single QD pixel is coupled to multiple QDs for enhanced radiance or super-radiance. The light passes through a notch UV filter (37) to remove stray UV light and then, through an AR layer (27), to the user. The result is a beam with a wider geometric cross section.

FIGS. 7A through 7I depict a set of embodiments, derived from FIG. 3C, that rely on refractive index engineering to control the direction of the light rays.

In FIG. 7A, light travels from a display panel (1) and is collimated by a graded-index (GRIN) material that varies in refractive index along the optic axis but that is invariant along the transverse direction (39). The GRIN slab (39) is engineered to collect all the light, including light rays that are traveling almost perpendicular to the optic axis. The light is then coupled out by a periodic structure (40) such as a photonic crystal or a plurality of metasurfaces. The periodic structure serves to collimate the beam further and to serve as a multilayer antireflection coating such that Fresnel reflection loss is minimized. Without the periodic structure, the transmittance would be $$1 - \frac{(1-n_{GRIN})^2}{(1+n_{GRIN})^2}, \qquad [\text{EQ. 1}]$$

where $n_{GRIN}$ is the refractive index of the GRIN material at the exit face. Further, the numerical aperture is increased, thus increasing both the light efficiency as well as the resolution.

In the refractive embodiment in FIG. 7B, light emitted from a display (1) is collimated by a GRIN slab (39) and then propagates through a nonlinear self-focusing material (91). The material can have a Kerr nonlinearity, or a saturable nonlinearity, or a nonlocal nonlinearity. It can be a photorefractive material. In this nonlinear layer (91), the light becomes more collimated instead of diverging because of the change of index from the GRIN material to the air (92). The resulting virtual image point (89) is, consequently, pushed deeper.

In the embodiment in FIG. 7C, a transparent layer of electrically addressable pixels (1) is embedded inside the GRIN material (39). In this way, both the right and left propagating rays are refracted toward the user, collecting more light. The light is coupled out by a periodic structure (40), such as a photonic crystal or a plurality of metasurfaces, to produce a deeper virtual image point. By blocking some of the rays, the apparent depth can be adjusted (89).

FIG. 7D1 depicts an embodiment in which the GRIN material is polarization-dependent (39) such that its index is graded for one polarization and constant for the other, perpendicular, polarization. Light from the display (1) passes through a QBQ (31) into the GRIN cavity (39) and is polarized such that it experiences a decreasing refractive index and spreads out. Alternatively, it can experience increasing refractive index and focus. The light strikes a QM (32) that rotates the polarization and reflects the light. The light then experiences a constant index on the return path and travels along a line. Another reflection by the QBQ (31) rotates the polarization back to the GRIN-sensitive orientation. As the light experiences alternately GRIN and constant index, the translation of the beam can be reduced or increased. The light is coupled out through the sides of the GRIN slab with a periodic structure (40).

FIG. 7D2 modifies FIG. 7D1 by illuminating the birefringent GRIN slab (39) from the edge with a projector (1). The orientation is such that the incident light is mostly transverse to the optic axis. Repeated internal reflections between a QM (32) and a QBQ (31) shift and compress the light until the rays can travel through the angular absorber (11) and the AR layer (27) to the user. In some embodiments, the GRIN slab can serve as a transparent display element that is illuminated from the edge.

Similarly, in FIG. 7D3, the GRIN material (39) is replaced by a birefringent LC layer (12, 13) controlled by an electric signal (26) and a glass slab (60). These two discrete elements produce the same effect as a GRIN slab (39) using discrete layers. The strength of the GRIN effect can be modulated by an electric signal applied to the LC.

FIG. 7E depicts an embodiment in which the light from a display (1) creates a virtual image point (89) as it is collimated by a GRIN slab (39) and then outcoupled to the user via at least one set of periodic dielectric nano-cones (93), such as titanium dioxide cones. The cone layers have varying pitch and angle to collimate the light. The nano-cones can be replaced with a set of metasurfaces or a photonic crystal. The periodic structure absorbs the transverse momentum through exchange with lattice momentum.

In the embodiment in FIG. 7F, the GRIN material (39) is cut so that its index modulation gradient is tilted with axial symmetry around the optic axis. The light from a display panel (1) is both collimated and redirected into an engineered direction to further modify the wavefront.

Figure 7I:
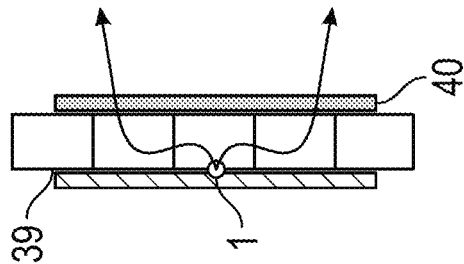
Figure 7H:
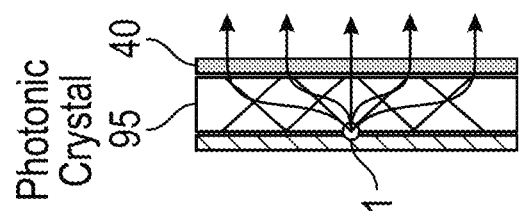
Figure 7G:
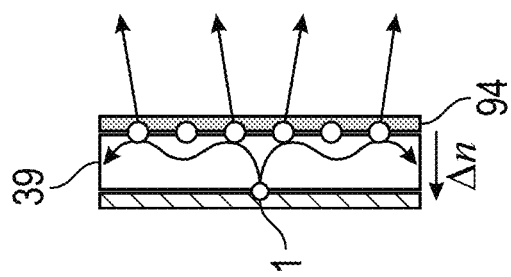

In the embodiment in FIG. 7G, light is emitted by a display panel (1) and collimated by a GRIN slab (39). The index variation is such that the refractive index increases along the optic axis and the light experiences periodic total internal reflection. At each maximum, the light couples to a periodic outcoupling layer (94). This is different from the embodiment in FIG. 7A in that the light experiences multiple round trips. Instead of a periodic outcoupling mechanism, a thin dielectric layer (94) can be inserted at the maximum positions of the light to modify the critical angle there so that some light exits the cavity.

FIG. 7H depicts an embodiment in which the GRIN slab is replaced by a photonic crystal slab (95). The light is self-collimated along multiple reflections inside the photonic crystal structure and couples out to the user. The slab (95) itself can outcouple the light, or a second periodic structure (40) can be added to further collimate the light.

In the embodiment in FIG. 7I, a display panel (1) emits light into a GRIN material (39) which has a checkerboard pattern of locally transverse-invariant refractive index material. For the pixel shown, the light first enters a region of decreasing index and consequently spreads out. The checkerboard periodicity is matched to the curving radius of the light rays, such that at the position where the light ray will be totally internally reflected, it enters a patch of increasing refractive index and reverse direction, toward the user. It exits via a periodic structure (40). The light from a single pixel is therefore collimated and expanded in its geometric cross section.

Analysis of the GRIN slab (39) is shown in FIGS. 8A through 8E. Let n(z) be the GRIN profile of a slab of thickness $z_s$. Let the z-axis be the optic axis. The trajectory x(z) of a ray starting at $x_0$ is:

$$x(z) = x_0 + \int_0^{z_s} \frac{C}{\sqrt{n^2(z') - C^2}} dz', \qquad [\text{EQ. 2}]$$

where $C = n_0 \sin \theta_0$ is the transverse momentum of the ray. Note that the slope of the trajectory is:

$$m(z) = \frac{dx}{dz} = \frac{C}{\sqrt{n^2(z) - C^2}}, \qquad [\text{EQ. 3}]$$

and the virtual (linear) ray corresponding to x(z) is:

$$x_l(z) = x(z_s) + m(z_s)(z - z_s). \qquad [\text{EQ. 4}]$$

The image point (or focusing point) of the virtual ray is the value of z, call it $z_l$, where it crosses the horizontal line through, $x_l(z_l) = x_0$, or $$0 = \int_0^{z_s} \frac{C}{\sqrt{n^2(z') - C^2}} dz' + \frac{C}{\sqrt{n^2(z) - C^2}} (z - z_I).  \quad [\text{EQ. 5}]$$

Note that the virtual image position depends on C, that is, on the initial angle.

The aberration D here is defined as the difference between the maximum and minimum virtual positions long the horizontal axis divided by the slab thickness:

$$D = \frac{|\max(z_I)| - |\min(z_I)|}{z_s}. \quad [\text{EQ. 6}]$$

The overall goal is to minimize D by a suitable refractive index profile, which need not be monotonic.

Figure 8A:
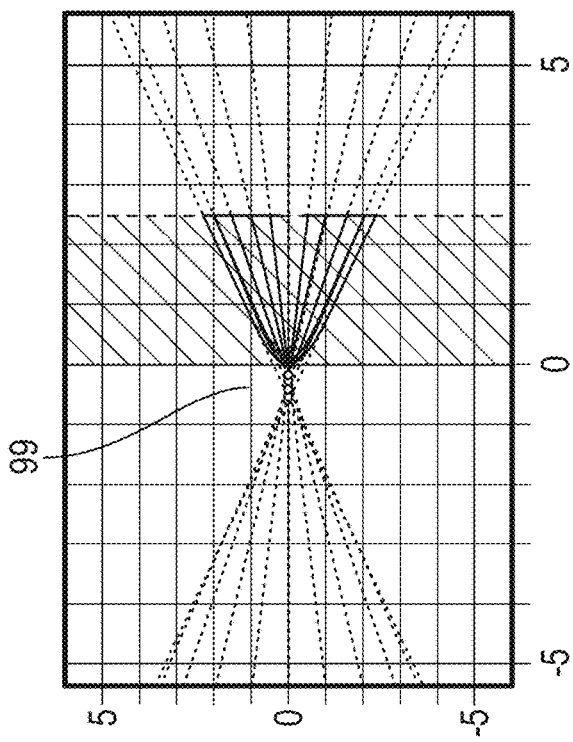
FIG. 8A-8E depict analyses of various scenarios of non-uniform refractive indices for some example embodiments in FIG. 7.
Figure 8B:
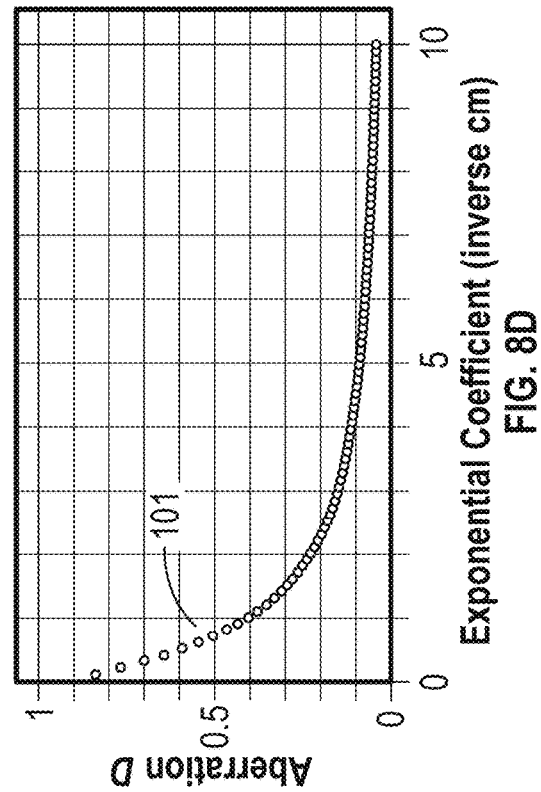
Figure 8C:
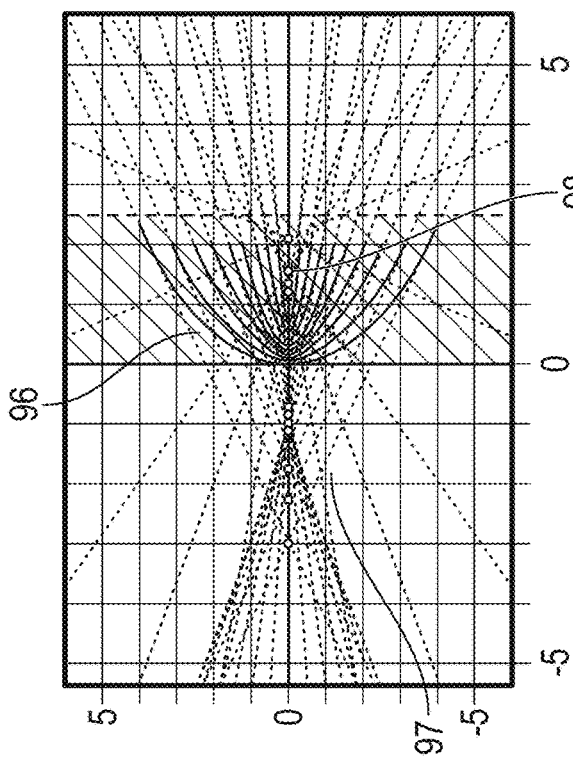
Figure 8D:
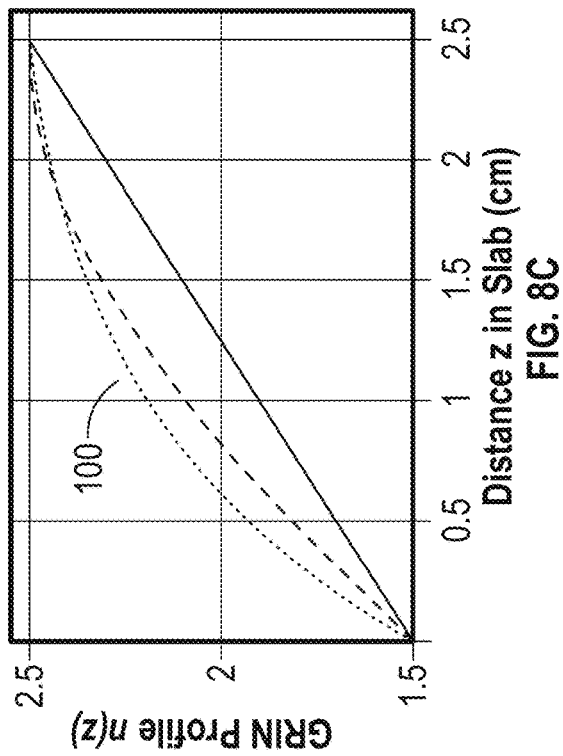

FIG. 8A is the theoretical calculation of the curved ray paths in a GRIN slab that has a linearly increasing refractive index, from 1.5 to 2.5 (96). Light rays entering the slab at an angle of less than ninety degrees experience collimation, and the set of dashed lines that intersect to the left of the slab correspond to virtual image points (97) before outcoupling to the user. The fact that they do not all intersect at the same point indicates that the image will show aberrations. The set of virtual image points within the slab (98) correspond to virtual image points without an outcoupling layer. FIG. 8B repeats the analysis for an exponentially varying index modulation. By adjusting the parameters of the index function, the aberration is reduced (99). It is possible to design GRIN slabs with varying index profiles (100), like those, for example, shown in FIG. 8C. The solid line is a linear profile, which produces the virtual rays in FIG. 8A, the dashed line corresponds to a sinusoidal modulation, and the dotted line corresponds to the exponential index profile used in FIG. 8B. For this last profile, the parameters of the index profile were adjusted, and the aberration D defined as normalized difference between the farthest and closest virtual points, was determined, shown in FIG. 8D. The aberration decreases monotonically (101) as the GRIN profile increases in exponential coefficient and therefore appears as a sharper gradient. Using a prototype index profile $n(z)=A(1-\exp(-Bz))$, the aberration D was plotted as a function of the parameter B. The parameter A was chosen to satisfy the boundary values of the refractive index: $n(0)=1.5$, $n(z_s)=2.5$, where $z_s$ is the thickness of the GRIN material. The result is shown in FIG. 6C, which indicates that the aberration is reduced for an increasingly sharp exponential decay. For comparison, the aberration for the linear and sinusoidal index profiles are $D=0.902$ and $D=0.605$, respectively.

Figure 8E:
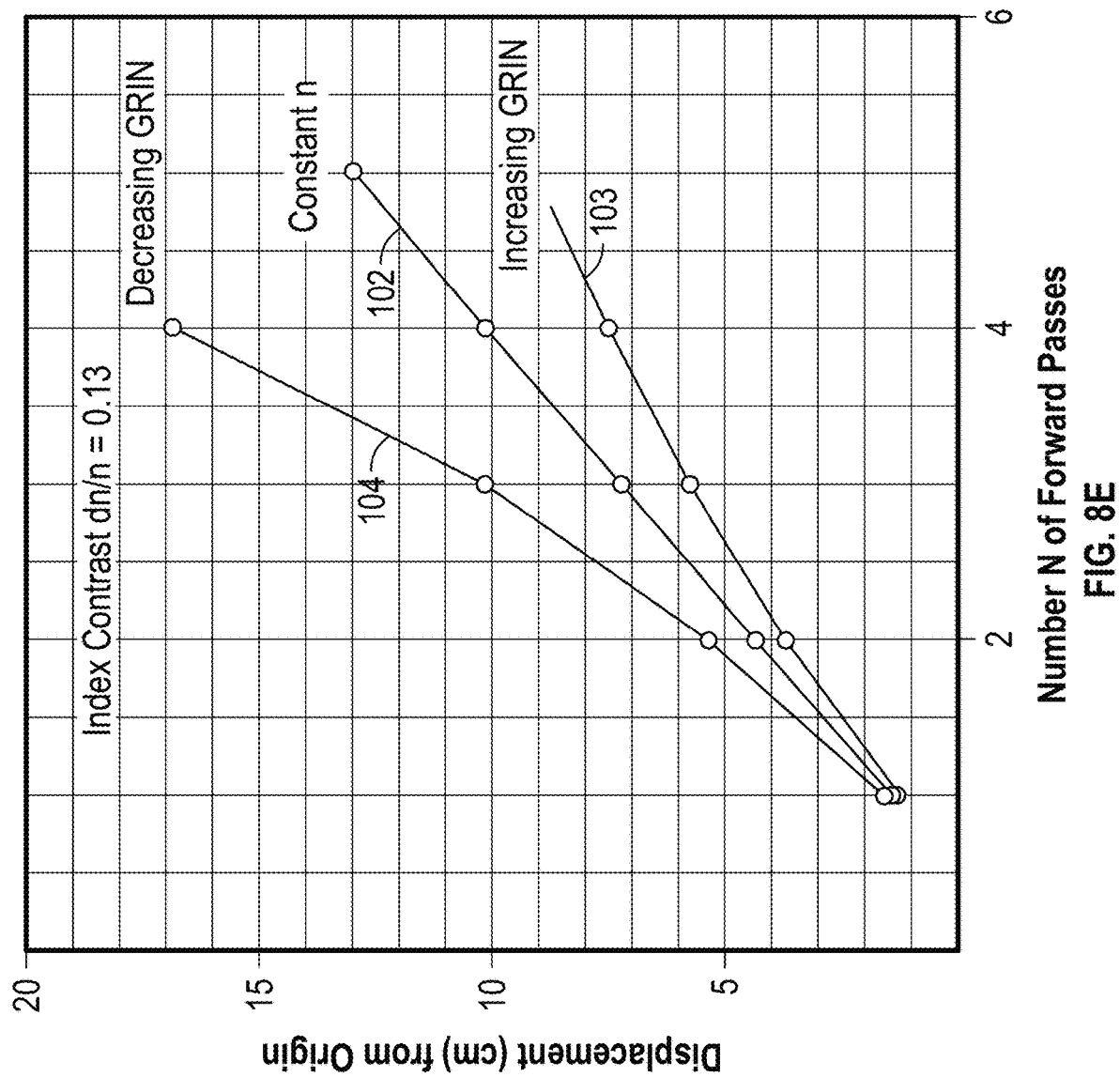

FIG. 8E graphs the transverse displacement of the light ray in FIG. 7D1 versus the number of passes. For a constant index, the shift is linear (102) because there is no refraction. Light in a birefringent GRIN material with an increasing index, here linearly increasing, experiences a smaller shift (103), and light in a birefringent GRIN material experiences a larger shift (104) than in the constant case. Here, the index ratio between the maximum index and minimum index is only 0.13 to avoid total internal reflection.

FIG. 9A through 9I depicts embodiments using time or wavefront modulation, as explained in FIG. 3D.

Figure 9A:
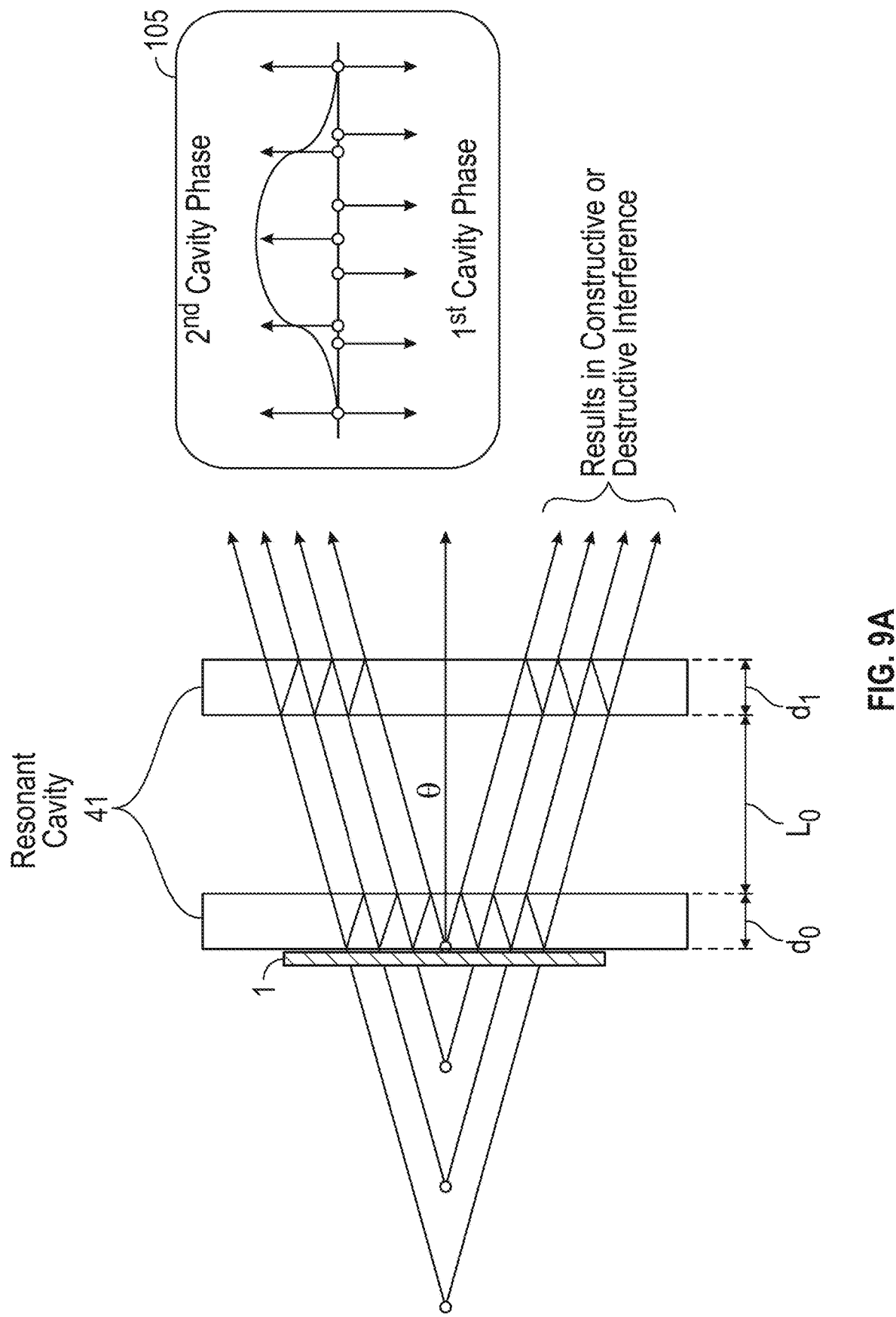

The embodiment in FIG. 9A consists of an optical system in which light from a display (1) travels through two internal resonant cavities (41). The thicknesses of the first resonant cavity and the second resonant cavity are $d_0$ and $d_1$, respectively, and the distance between them is $L_0$. The two resonant cavities have high efficiency such that the light makes multiple round trips inside them. The rays that exit the system are, consequently, a superposition of multiple internal reflections and produce multiple virtual images. The cavity parameters are designed to produce constructive interference for a subset of these virtual images and deconstructive interference for others, nullifying them. As shown in the inset (105), for example, two sets of cavity phases interfere constructively for central orders but deconstructively at the edges. This embodiment can have an arbitrary number of resonant cavities.

The embodiment in FIG. 9B starts with light being emitted by a UV light source (1) plus a pixel matrix (80). A QD layer (38) is sandwiched between two transparent, conductive layers (86), such as ITO. The conductive layers are excited with a variable AC source and control circuitry (106), for example, with variable capacitors, to produce electronic standing waves along the conducting layers. The result is a modulation in the properties of the QD layer (38) to adjust the emission time and wavefront of each QD. The signal can be engineered to produce QD emission delays and collimate the resulting visible light. AC control circuitry (106) on the order of 10 GHz corresponds to a standing wave wavelength of 1 micron, which is on the order of a pixel size. The light passes through a notch filter (37) to remove excess UV light.

The embodiment in FIG. 9C emits light from a display panel (1) with multiple sets of directional QDs (107). Each set emits collimated beams of light to produce a discrete set of large, collimated beams that correspond to a virtual point infinitely far away. The light passes through two temporally modulated prismatic layers (108) to tilt the angles of the beams in the x- and y-directions. The light enters the user's eyes, which observes these infinity-focused points-scanning patches, the cumulative effect of which is a raster-scanned image located at an infinite depth. The QDs can be electroluminescent and electrically addressed, or the sweep layers can have angular color filters to create a color image.

In the embodiment in FIG. 9D, light passes from a display panel (1) through a thick isotropic wave retarder (109) that rotates the polarization by an amount corresponding to the distances the light rays propagate. Higher-angled rays travel a longer distance and rotate their polarization more. Concentric rings of s- and p-polarized light (110) are created, and the retarder is chosen such that the spacing between these shells is larger than the wavelength. The retarder can be a liquid, a LC, or a photorefractive material. The light then travels through an absorptive polarizer (8) such that the light polarized along the axis is extinguished. In some embodiments, a reflective polarizer could be used instead if multiple passes through the retarder is desired. The light is now modulated transversely. It travels through a QBQ (31). The light then couples to the rest of the FEC through a wire grid polarizer (30), absorptive polarizer (8), and AR shield layer (27) to the user. The QBQ (31) and wire grid (30) allow for a round trip of the light within the cavity.

FIG. 9E depicts the subwavelength version of FIG. 9D. Here, light from the display panel (1) travels through an isotropic wave-retarding material (109) with strongly rotating polarization such that the concentric shells of s- and p-polarized light are on the order of a wavelength. The light then propagates through an absorptive polarizer (8), to create a transverse intensity modulation, and then through a QBQ (31). The result is an effective aperture pattern, a pinhole array, all made from homogeneous materials. Each local bright spot acts as a new Huygens' source that together form a collimated broad wave. The retarding material can be actively controlled to adjust the spacing between the shells and therefore the effective aperture periodicity. This in turn adjusts the collimation of the final beam. The light then couples to the rest of the FEC through a wire grid polarizer (30), absorptive polarizer (8), and AR shield layer (27) to the user. The QBQ (31) and wire grid (30) allow for a round trip of the light within the cavity.

Similarly, the embodiment in FIG. 9F produces light from a display panel (1) through a thin retarding layer (109) that gradually rotates the polarization from p-polarization to s-polarization after multiple passes. The cavity is efficient, such that the light experiences multiple reflections between a first and a second PBS (20) and acquires a polarization shift upon reflection on an isotropic retarder (109) at each round trip. After several round trips, determined by the retardation strength, the light is s-polarized and can exit the cavity through the second BPS (20).

The embodiment in FIG. 9G is an "N-shaped" cavity. Light from a display panel (1) passes through a beam splitter (19) and then through an acoustically modulated wire grid polarizer (110). The light then travels through a QWP (10) to convert the linear polarization into circular polarization, which is reflected by a beam splitter (19). A reverse pass through the cavity rotates the polarization into linear polarization that is cross polarized with the wire grid polarizer (110), which then acts as a mirror for the light to pass through to the user. In this embodiment, the effect is that the light rays can be translated transverse to the optic axis.

FIG. 9H depicts an embodiment in which a GRIN slab (39) is modulated by transducers (111). The transducers can be embedded as transparent transducers within the slab, and the slab (39) can be electro-optic or photorefractive. The transducers control the refractive index gradient direction as light travels from the display panel (1) into the slab. The gradient direction can be modulated in time in an arbitrary way to engineer the wavefront of the light.

In the embodiment in FIG. 9I, light from the display (1) propagates through the cavity (3). The reflector on the right (3) is 99% reflective and some leaks out. After each round trip, the light experiences a subsequent phase shift that depends on the cavity thickness. If the phase shifts are small relative to the overall apparent depth desired, i.e., the depth bias, the phase difference (aberration) is negligible.

Auxiliary embodiments are shown in FIGS. 10A through 10D.

As shown in FIG. 10A, a plurality of periodic layers (112) could be used in any of the embodiments described. The periodicity could be macroscopic or subwavelength. The structure could also be quasi-periodic. By overlaying two such layers with varying frequency, locally varying structures are produced (113). An example of a produced structure is a lenslet array. These could also be implemented by rotating one pattern relative to another, for example, with two hexagonal lattices. Each individual structure could be nano-imprinted, and the overlap can be modulated using mechanical actuators.

In FIG. 10B, a birefringent GRIN material (39) is used in a confocal imaging setup. The birefringent GRIN slab (39) is illuminated from the edge by a white-light source (1). x-polarized light, for example, will experience a GRIN layer and curve to the left, where it is reflected and rotated into y-polarization by a QM (32). This light ray experiences no graded index and travels to the left along a line, where it is reflected by a QBQ (31), thus changing back into x-polarized light, which again experiences the graded index. After multiple round trips, the light rays will asymptotically overlap and travel in the same direction as a collimated beam (114) and exit the cavity through an angular profiling layer (11) and AR layer (27). The beam can be used as a non-diffracting-like beam or be focused by a lens. The birefringent GRIN slab (39) can be modulated by an external voltage source to vary the collimation and position of the exiting light and therefore scan confocally through a sample to be imaged without any moving parts.

In FIG. 10C, an array of RGB coherent light sources (115) is coupled into a birefringent GRIN slab (39) that is disk shaped. Alternatively, laser light is coupled into a whispering gallery mode of the display cavity, and at each entry point for the coherent light, a prismatic element can redirect the laser light into the GRIN slab (39). The laser light is modulated by a Radon transform such that the coherent superposition of the light (116, 117) within the GRIN slab produces a collection of bright spots that correspond to a desired image. The light rays then propagate into the GRIN slab, as in FIG. 7D2, until they acquire transverse momentum and exit the cavity to the user. As an example, the Radon transform used in volumetric imaging converts a volume $f(x,y)$ into a series of projections at a distance l and angle θ:

$$R\{f\}(l,\theta) = \int_{-\infty}^{\infty} f(s \sin\theta + l \cos\theta, -s \cos\theta + l \sin\theta)ds \quad [\text{EQ. 7}]$$

In FIG. 10C, f corresponds to the image to be produced, so each laser beam at position (l,θ) is fed the corresponding value of R, such that their coherent superposition performs the inverse Radon transform optically. Information about the GRIN slab must be input into the inverse Radon calculation of the laser light.

The idea of edge-emitted cavities includes vertical FECs with a trigger, as shown in FIG. 10D. In this embodiment, a standard FEC is oriented such that the display (1) emits light vertically through a beam splitter (19) into the cavity. The display includes a signal pixel of infrared light (118), which is invisible to the user. This pixel can be modulated intensity, and it couples into a second beam splitter (119) that is composed of a nonlinear material responsive to IR. The IR signal is guided along the nonlinear beam splitter via, e.g., total internal reflection. As the beam splitter absorbs the IR light, its refractive index changes in a time-dependent way that depends on the intensity of the signal pixel. For very low signal intensities, the index change takes a long time so that the image experiences many round trips before being reflected. For strong signal intensities, the index change happens quickly, and the image experiences one or only a few round trips. In this way, the signal intensity can trigger the number of round trips of the light and, correspondingly, the virtual image depth seen by the user. The image depth can vary per frame. The nonlinear material and signal pixel can be arbitrarily engineered, or it can be designed using any methods that are used in cavity dumping of laser light.

Figures 11A, 11B:
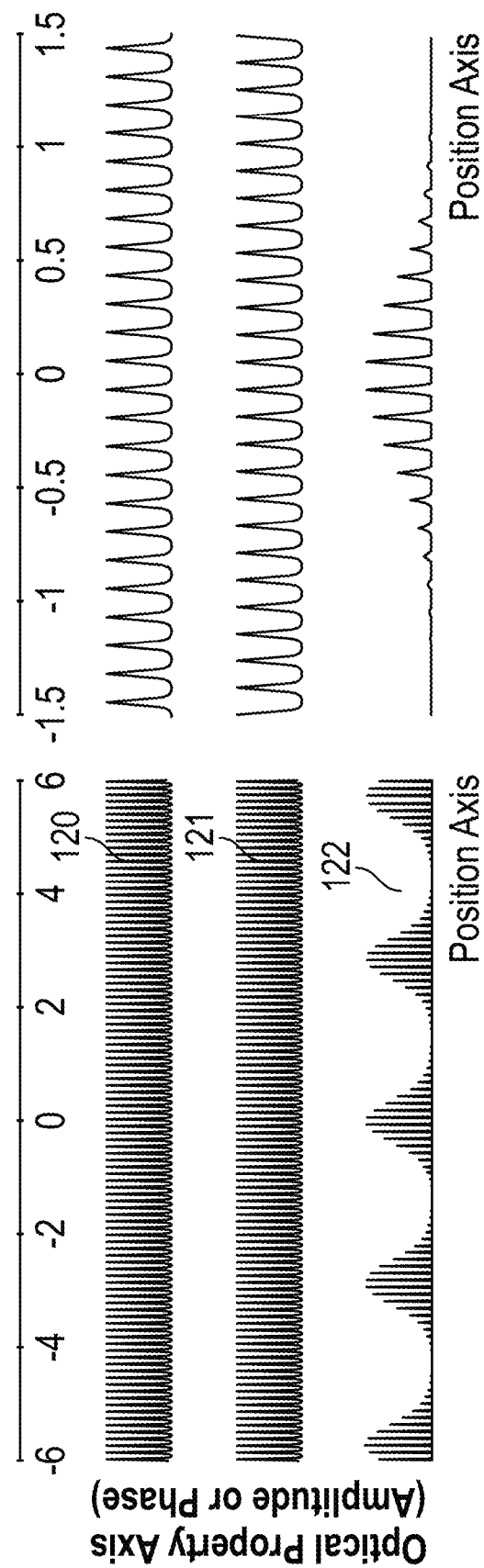
FIGS. 11A-11B depict an analysis of creating locally varying structures from periodic arrays for wavefront modulation techniques using Moiré-type interference.

Shown in FIG. 11 is an analysis of using overlaying transversely periodic structures to mimic locally varying effects, as discussed in FIG. 10A. In FIG. 11A, two nearly identical periodic structures (120, 121) vary in position in one dimension. The top function (120) is $f_1(x)=\exp[-a[\cos(k_1 x)]^2]$. The middle function (121) is $f_2(x)=\exp[-a[\cos(k_2 x)]^2]$. The bottom function (122) is the product of these two given functions. Note that the small difference in frequencies produces a beat note. FIG. 11B is a close-up view of FIG. 11A.

The fast frequencies can be sub-wavelength, and the beat frequency can be larger than a wavelength. This pattern can be used to produce, for example, a lenslet array or a periodic pinhole array. Higher dimensionality allows for more freedom in design. Designing a given macroscopic, locally varying structure requires Fourier analysis of the underlying periodic structures. If the result is a product of the given periodic structures, the analysis is similar to wave mixing in nonlinear optics. Therefore, further effects could be induced using nonlinear materials for these layers. For example, consider the production of a slowly varying function with periodicity kslow that is produced by a product (or sum) of fast-periodic structures, $k_1$ and $k_2$. In the Fourier domain, it requires a phase-matching algorithm to design the latter functions such that their convolution includes the desired frequencies, i.e., such that the sum and difference frequencies of $F_1(k)*F_2(k)$ (where * indicates convolution of the two functions, and $F_1$ and $F_2$ correspond to the Fourier transforms of, respectively, $f_1$ and $f_2$) includes the desired $k_{slow}$. The functions are chosen from a minimization algorithm to reduce unwanted artifacts, or the resulting optical signal could be filtered in the spatial Fourier domain to remove them.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical system, comprising:
   a display matrix resulting in an optical system that displays images such that image depths to a viewer are different than a depth of a surface of the display matrix to the viewer;
   a secondary light source that is optically coupled to the display matrix, the secondary light source comprising a nanostructure that impacts light received from the display matrix;
   a reflective element that is transparent with respect to the display matrix but reflective with respect to the secondary light source, the reflective element being disposed between the display matrix and the secondary light source; and
   a semi-reflective layer disposed after the secondary light source, such that reflection of light from the secondary light source by the reflective element and back through the semi-reflective element results in greater than 25% of an energy of the light from the display matrix exiting the optical system.

2. The optical system of claim 1, further comprising:
   a polarization-impacting component disposed between the reflective element and the secondary light source, wherein the semi-reflective element comprises a polarization-impacting component and a reflective polarization-dependent component, such that these elements form a cavity.

3. The optical system of claim 1, wherein a path that light representing at least one of the virtual images travels within the optical system is at least partially folded onto itself.

4. The optical system of claim 1, wherein a transverse momentum of the light is altered by transversely periodic or transversely homogenous elements.

5. The optical system of claim 1, wherein at least one of the elements is curved or free-formed.

6. The optical system of claim 1, wherein the optical system is configured to produce a plurality of virtual images at different optical depths by directing light rays to cause light of each of the plurality of virtual images to travel a different distance within the optical system before exiting the optical system on a path to the viewer.

7. The optical system of claim 1, wherein the secondary light source is an optically resonant structure.

8. The optical system of claim 1, wherein the optical system is configured to be worn on the body as a near-eye display or personal accessory, or configured to be used far from the face as in any display devices such as cell phones, tablets, viewers, viewfinders, monitors, televisions, automotive displays, or vehicle instrument clusters with virtual depth.

9. An optical system, comprising:
a first light source;
a secondary light source that is optically coupled to the first light source, the secondary light source comprising a nanostructure that impacts light received from the first light source;
a reflective element that is transparent with respect to the first light source but reflective with respect to the secondary light source, the reflective element being disposed between the first light source and the secondary light source; and
a semi-reflective layer disposed after the secondary light source, such that reflection of light from the secondary light source by the reflective element and back through the semi-reflective element results in greater than 25% of an energy of the light from first light source exiting the optical system; wherein
the first light source is a display matrix resulting in an optical system that displays images such that the image depths are different then the depth of the surface of the first light source, such that a wavefront of the light is modulated only with elements that do not macroscopically vary transverse to the optic axis.

10. The optical system of claim 9, further comprising a resonant structure, wherein the resonant structure is periodic, random, or quasi-periodic to achieve desired performance.

11. The optical system of claim 9, further comprising a transverse waveguide and a metallic masked layer, wherein the light produced by the metallic masked layer is optically coupled with said transverse waveguide for directing the light.

12. The optical system of claim 9, further comprising a resonant structure, wherein the resonant structure is optically coupled to at least one magneto-optical element.

13. The optical system of claim 9, further comprising a resonant structure, wherein individual pixels of the resonant structure comprise a set of differently oriented resonant structures to eliminate diffractive artifacts.

14. The optical system of claim 9, further comprising a resonant structure, wherein the resonant structure further comprises resonant dipoles with angular tunability.

15. The optical system of claim 9, further comprising:
a resonant structure; and
an additional element to select or block specified resonant modes.

16. The optical system of claim 9, further comprising a resonant structure, wherein a light path of the light from the resonant structure is modified by mechanical actuation to remove diffractive effects.

17. The optical system of claim 9, wherein an emission profile of each pixel can be modified so that collimation and the depth of the beam can be adjusted.

18. The optical system of claim 9, wherein the optical system is configured to be worn on the body as a near-eye display or personal accessory, or configured to be used far from the face as in any display devices such as cellphones, tablets, viewers, viewfinders, monitors, televisions, automotive displays, or vehicle instrument clusters with virtual depth.

19. An optical system, comprising:
a light sensor;
a light source that is optically coupled to the light sensor and that is optically coupled to light incident on the optical system from outside the optical system;
a reflective element that is reflective with respect to the light source but transparent with respect to the light from outside the optical system, the reflective element being disposed between the light from outside the optical system and the light source; and
a semi-reflective layer disposed between the light source and the light sensor, such that the reflection of light from the light source between the reflective element and back through the semi-reflective element results in greater than 25% of an energy of the light from outside the optical system reaching the light sensor, the optical system capable of capturing images with a lens group.

20. The optical system of claim 19, wherein pixels of the light sensor have resonant masks deposited onto them such that only focused image light can pass through.

21. The optical system of claim 20, wherein a structure of the resonant masks is periodic, random, or quasi-periodic to achieve desired performance.

22. The optical system of claim 20, wherein the light paths of the light from the structure are modified by mechanical actuation to remove diffractive effects.

23. The optical system of claim 19, wherein the optical system is configured to produce a plurality of image focus planes at different optical depths by directing light rays to cause light of each of the plurality of focal planes to travel a different distance within the optical subsystem before exiting the optical subsystem on a path to the light sensor.

24. The optical system of claim 19, wherein the optical system is integrated into a cell phone, a tablet, a viewer, a viewfinder, a monitor, a television, or teleconferencing camera with multifocal or lightfield imaging capabilities.

25. The optical system of claim 19, wherein the optical system is a component of a microscope, endoscope, hyperspectral imaging system, time-of-flight imaging system, telescope, remote imaging system, scientific imaging system, spectrometer, satellite imagery camera, navigation imaging system, spatial localization and mapping imaging system, 3D scanner, or scanning system.

* * * * *